United States Patent
Toyodome et al.

(10) Patent No.: US 11,101,728 B2
(45) Date of Patent: Aug. 24, 2021

(54) POWER CONVERTING APPARATUS, MOTOR DRIVE CONTROL APPARATUS, BLOWER, COMPRESSOR, AND AIR CONDITIONER

(71) Applicant: Mitsubishi Electric Corporation, Tokyo (JP)

(72) Inventors: Shinya Toyodome, Tokyo (JP); Takashi Yamakawa, Tokyo (JP); Shigeo Umehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 9 days.

(21) Appl. No.: 16/605,444

(22) PCT Filed: Jun. 26, 2017

(86) PCT No.: PCT/JP2017/023385
§ 371 (c)(1),
(2) Date: Oct. 15, 2019

(87) PCT Pub. No.: WO2019/003270
PCT Pub. Date: Jan. 3, 2019

(65) Prior Publication Data
US 2020/0127554 A1      Apr. 23, 2020

(51) Int. Cl.
| H02M 1/14 | (2006.01) |
| H02P 27/06 | (2006.01) |
| H02M 7/219 | (2006.01) |

(52) U.S. Cl.
CPC .......... *H02M 1/143* (2013.01); *H02M 7/219* (2013.01); *H02P 27/06* (2013.01)

(58) Field of Classification Search
CPC ........ H02M 1/143; H02M 7/219; H02P 27/06
See application file for complete search history.

(56) References Cited

U.S. PATENT DOCUMENTS

2011/0227522 A1* 9/2011 Shinomoto ......... H02M 1/4225
318/400.29

FOREIGN PATENT DOCUMENTS

| JP | S60-162482 A | 8/1985 |
| JP | S63-190562 A | 8/1988 |
| JP | 2014-090570 A | 5/2014 |

OTHER PUBLICATIONS

Jih-Sheng Lai et al. "Energy Management Power Converters in Hybrid Electric and Fuel Cell Vehicles", Proceedings of the IEEE, p. 766-777, vol. 95, No. 4, Apr. 2007.*

(Continued)

*Primary Examiner* — Kawing Chan
*Assistant Examiner* — Bradley R Brown
(74) *Attorney, Agent, or Firm* — Posz Law Group, PLC

(57) ABSTRACT

A power converting apparatus includes: a boost circuit including a reactor supplied with first voltage output from an alternating-current power supply, a first leg including first upper-arm and lower-arm switching elements connected in series, and a second leg connected in parallel with the first leg and including second upper-arm and lower-arm switching elements connected in series, and boosting the first voltage; a first voltage detecting unit detecting the first voltage; a smoothing capacitor smoothing voltage output from the boost circuit; and a second voltage detecting unit detecting second voltage smoothed by the smoothing capacitor. When the second voltage is larger than the first voltage and is lower than or equal to twice the first voltage, a width of a second drive pulse to turn on the first upper-arm switching element is larger than a width of a first drive pulse to turn on the first lower-arm switching element.

20 Claims, 14 Drawing Sheets

(56) References Cited

OTHER PUBLICATIONS

Vamanan Nimesh et al. "Dual Comparison One Cycle Control for Single Phase AC to DC Converters", IEEE Transactions on Industry Applications, p. 3267-3278, vol. 52, No. 4, Jul./Aug. 2016.*
Extended European Search Report dated May 28, 2020 issued in corresponding EP application No. 17915526.2.

* cited by examiner

POWER CONVERTING APPARATUS, MOTOR DRIVE CONTROL APPARATUS, BLOWER, COMPRESSOR, AND AIR CONDITIONER

CROSS REFERENCE TO RELATED APPLICATION

This application is a U.S. national stage application of International Patent Application No. PCT/JP2017/023385 filed on Jun. 26, 2017, the disclosure of which is incorporated herein by reference.

TECHNICAL FIELD

The present invention relates to a power converting apparatus that converts alternating-current power supplied from an alternating-current power supply into direct-current power and supplies the direct-current power to a load, a motor drive control apparatus including the power converting apparatus, a blower and a compressor including the motor drive control apparatus, and an air conditioner including the blower or the compressor.

BACKGROUND

A rectifier circuit is a circuit that converts alternating-current power supplied from an alternating-current power supply into direct-current power. The rectifier circuit in Patent Literature 1 below uses a parasitic diode of a metal-oxide-semiconductor field-effect transistor (MOSFET) and applies an operation signal to the gate of the MOSFET so that a current flows between the source and the drain for rectification.

PATENT LITERATURE

Patent Literature 1: Japanese Patent Application Laid-open No. S60-162482

However, in the rectifier circuit in Patent Literature 1, the MOSFET is ON all the time when the polarity of the power supply voltage output from the alternating-current power supply is positive. Therefore, the application of the rectifier circuit in Patent Literature 1 to a power converting apparatus is problematic because when the voltage of the smoothing capacitor provided in the power converting apparatus becomes higher than the power supply voltage, a backflow current flows from the smoothing capacitor to the alternating-current power supply side.

SUMMARY

The present invention has been made in view of the above, and an object thereof is to obtain a power converting apparatus capable of preventing a backflow current from the smoothing capacitor to the alternating-current power supply side even when the voltage of the smoothing capacitor becomes higher than the power supply voltage.

In order to solve the problem described above and achieve the object, a power converting apparatus according to an aspect of the present invention includes: a boost circuit comprising a reactor, a first leg, and a second leg, and boosting a first voltage output from an alternating-current power supply, the reactor being connected at one end to the alternating-current power supply and being supplied with the first voltage, the first leg comprising a first upper-arm switching element and a first lower-arm switching element connected in series, a connection point between the first upper-arm switching element and the first lower-arm switching element being connected to another end of the reactor, the second leg being connected in parallel with the first leg and comprising a second upper-arm switching element and a second lower-arm switching element connected in series, a connection point between the second upper-arm switching element and the second lower-arm switching element being connected to the alternating-current power supply; a first voltage detecting unit connected to both ends of the alternating-current power supply and detecting the first voltage; a smoothing capacitor connected to both ends of the boost circuit and smoothing a voltage output from the boost circuit; and a second voltage detecting unit connected to both ends of the smoothing capacitor and detecting a second voltage smoothed by the smoothing capacitor. When the second voltage is larger than the first voltage and is lower than or equal to twice the first voltage, a width of a second drive pulse to turn on the first upper-arm switching element is larger than a width of a first drive pulse to turn on the first lower-arm switching element.

The power converting apparatus according to the present invention can achieve an effect of preventing a backflow current from the smoothing capacitor to the alternating-current power supply side even when the voltage of the smoothing capacitor becomes higher than the power supply voltage.

DETAILED DESCRIPTION

Hereinafter, a power converting apparatus, a motor drive control apparatus, a blower, a compressor, and an air conditioner according to embodiments of the present invention will be described in detail with reference to the accompanying drawings. The present invention is not limited to the following embodiments. In the following description, electrical connection will be simply referred to as "connection".

First Embodiment

Figure 1:
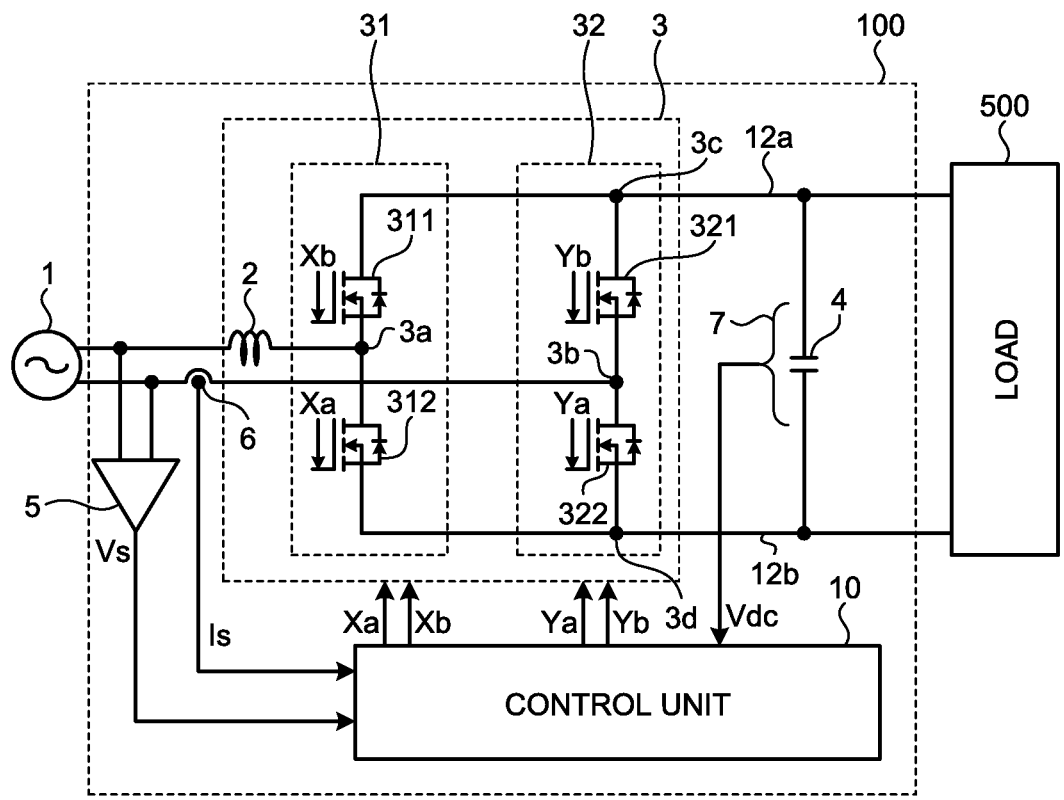
FIG. 1 is a diagram illustrating an exemplary configuration of a power converting apparatus according to a first embodiment.

FIG. 1 is a diagram illustrating an exemplary configuration of a power converting apparatus according to a first embodiment. A power converting apparatus 100 according to the first embodiment is a power converting apparatus having an AC-DC conversion function of converting alternating-current power supplied from a single-phase alternating-current power supply 1 into direct-current power and supplying the direct-current power to a load 500. As illustrated in FIG. 1, the power converting apparatus 100 according to the first embodiment includes a boost circuit 3, a smoothing capacitor 4, a first voltage detecting unit 5, a power supply current detecting unit 6, a second voltage detecting unit 7, and a control unit 10. The load 500 can be exemplified by a three-phase motor incorporated in a blower, a compressor, or an air conditioner.

The boost circuit 3 includes a reactor 2, a first leg 31, and a second leg 32. The first leg 31 and the second leg 32 are connected in parallel. In the first leg 31, a first upper-arm switching element 311 and a first lower-arm switching element 312 are connected in series. In the second leg 32, a second upper-arm switching element 321 and a second lower-arm switching element 322 are connected in series.

One end of the reactor 2 is connected to the alternating-current power supply 1. The other end of the reactor 2 is connected to a connection point 3a between the first upper-arm switching element 311 and the first lower-arm switching element 312 in the first leg 31. A connection point 3b between the second upper-arm switching element 321 and the second lower-arm switching element 322 is connected to the other end of the alternating-current power supply 1. In the boost circuit 3, the connection points 3a and 3b form an alternating-current terminal. The boost circuit 3 boosts the voltage output from the alternating-current power supply 1. Hereinafter, the voltage output from the alternating-current power supply 1 is referred to as "power supply voltage". Note that the power supply voltage may also be referred to as the "first voltage".

Each of the first upper-arm switching element 311, the first lower-arm switching element 312, the second upper-arm switching element 321, and the second lower-arm switching element 322 includes a metal-oxide-semiconductor field-effect transistor (MOSFET) and a diode connected in antiparallel to the MOSFET. The term "antiparallel" means that the cathode of the diode is connected to the drain of the MOSFET and the anode of the diode is connected to the source of the MOSFET. Note that the diode may be a parasitic diode contained in the MOSFET itself. Parasitic diodes are also called body diodes.

FIG. 1 depicts a MOSFET as a non-limiting example of each of the first upper-arm switching element 311, the first lower-arm switching element 312, the second upper-arm switching element 321, and the second lower-arm switching element 322. A MOSFET is a switching element that allows current to flow in both directions between the drain and the source. Any switching element may be used as long as it allows current to flow in both directions between the first terminal corresponding to the drain and the second terminal corresponding to the source.

A material for the first upper-arm switching element 311, the first lower-arm switching element 312, the second upper-arm switching element 321, and the second lower-arm switching element 322 is exemplified by silicon (Si), silicon carbide (SiC), or gallium nitride (GaN). However, any material other than these may be used.

One end of the smoothing capacitor 4 is connected to a direct-current bus 12a on the high-potential side. The direct-current bus 12a is drawn from a connection point 3c between the first upper-arm switching element 311 in the first leg 31 and the second upper-arm switching element 321 in the second leg 32. The other end of the smoothing capacitor 4 is connected to a direct-current bus 12b on the low-potential side. The direct-current bus 12b is drawn from a connection point 3d between the first lower-arm switching element 312 in the first leg 31 and the second lower-arm switching element 322 in the second leg 32. In the boost circuit 3, the connection points 3c and 3d form a direct-current terminal.

The voltage output from the boost circuit 3 is applied across the smoothing capacitor 4. The smoothing capacitor 4 smooths the voltage output from the boost circuit 3. The smoothing capacitor 4 is connected to the direct-current buses 12a and 12b, and the voltage smoothed by the smoothing capacitor 4 is referred to as "bus voltage". Note that the bus voltage may also be referred to as the "second voltage". The bus voltage is also applied to the load 500.

The first voltage detecting unit 5 is connected to both ends of the alternating-current power supply 1. The first voltage detecting unit 5 detects a power supply voltage Vs and outputs the power supply voltage Vs to the control unit 10. The power supply voltage Vs is the absolute value of the instantaneous voltage of the alternating-current power supply 1.

The power supply current detecting unit 6 is disposed between the alternating-current power supply 1 and the boost circuit 3. The power supply current detecting unit 6 detects a power supply current Is flowing between the alternating-current power supply 1 and the boost circuit 3 and outputs the power supply current Is to the control unit 10.

The second voltage detecting unit 7 is connected to both ends of the smoothing capacitor 4. The second voltage detecting unit 7 detects a bus voltage Vdc and outputs the bus voltage Vdc to the control unit 10.

The control unit 10 generates a drive pulse for driving each switching element of the boost circuit 3 on the basis of the values detected by the first voltage detecting unit 5, the power supply current detecting unit 6, and the second voltage detecting unit 7. Each switching element of the boost circuit 3 is turned on or off by the drive pulse generated by the control unit 10. In each of the first leg 31 and the second leg 32, the upper-arm switching element and the lower-arm switching element operate complementarily. That is, when one of the upper-arm switching element and the lower-arm switching element is on, the other is off.

When distinguishing between the drive pulses for driving the switching elements of the boost circuit 3, the drive pulse for driving the first lower-arm switching element 312 may be referred to as the "first drive pulse" and the drive pulse for driving the first upper-arm switching element 311 may be referred to as the "second drive pulse". The drive pulses for driving the second upper-arm switching element 321 and the second lower-arm switching element 322 may be collectively referred to as "synchronous drive pulses". The first drive pulse corresponds to Xa in the drawings, the second drive pulse corresponds to Xb in the drawings, and the synchronous drive pulses correspond to Ya and Yb in the drawings.

Next, the basic circuit operation of the power converting apparatus 100 according to the first embodiment will be described with reference to FIGS. 1 to 5.

Figure 2:
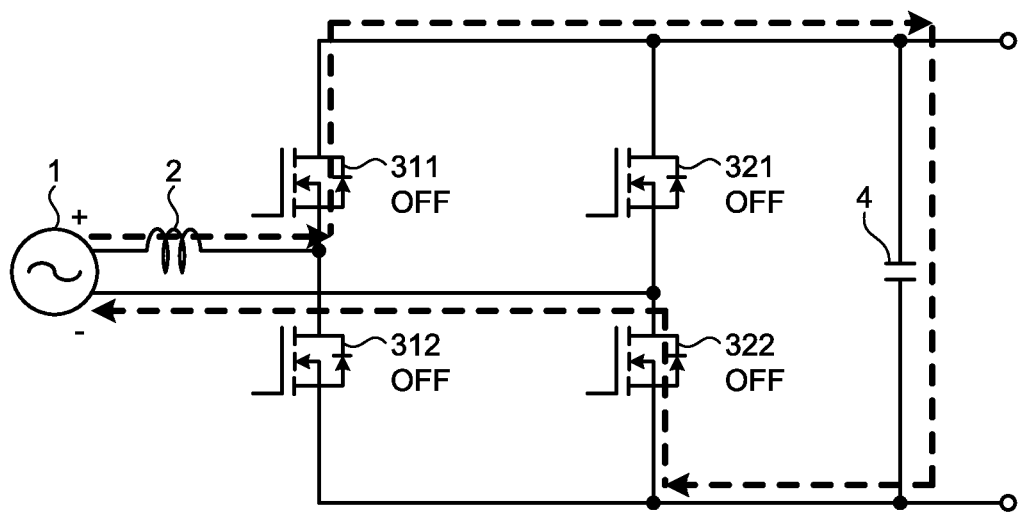
FIG. 2 is a diagram illustrating a charging path for a smoothing capacitor for the case that the power supply voltage is positive and synchronous rectification is not performed.
Figure 3:
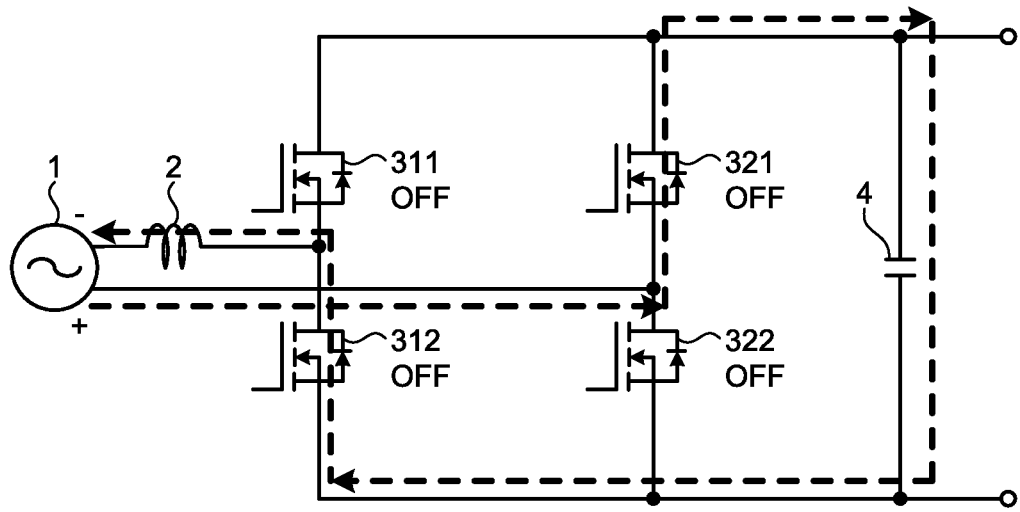
FIG. 3 is a diagram illustrating a charging path for the smoothing capacitor for the case that the power supply voltage is negative and synchronous rectification is not performed.
Figure 4:
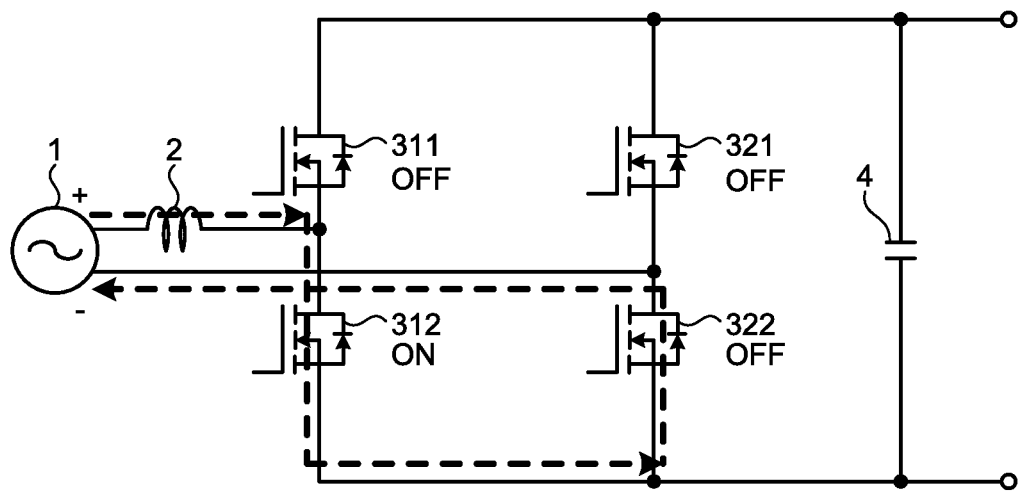
FIG. 4 is a diagram illustrating a short-circuit path for an alternating-current power supply through a reactor for the case that the power supply voltage is positive.
Figure 5:
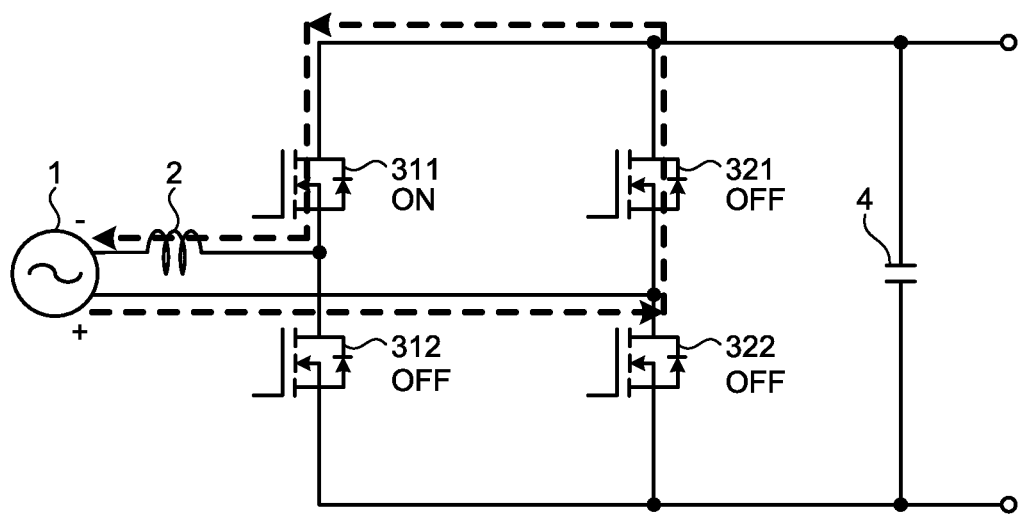
FIG. 5 is a diagram illustrating a short-circuit path for the alternating-current power supply through the reactor for the case that the power supply voltage is negative.

FIGS. 2 and 3 are diagrams each illustrating a current path for charging the smoothing capacitor 4, that is, a charging path for the smoothing capacitor 4. The difference between the two is that the polarity of the power supply voltage Vs in FIG. 2 is positive, that is, the power supply voltage Vs in FIG. 2 is positive, and the polarity of the power supply voltage Vs in FIG. 3 is negative, that is, the power supply voltage Vs in FIG. 3 is negative. FIGS. 4 and 5 are diagrams each illustrating how the two ends of the alternating-current power supply 1 are short-circuited through the reactor 2 without charging the smoothing capacitor 4, that is, illustrating a short-circuit path for the alternating-current power supply 1 through the reactor 2. The difference between the two is that the power supply voltage Vs in FIG. 4 is positive and the power supply voltage Vs in FIG. 5 is negative.

When the upper terminal of the alternating-current power supply 1 has a positive potential as illustrated in FIGS. 2 and 4, the polarity of the power supply voltage Vs is defined as positive. When the upper terminal of the alternating-current power supply 1 has a negative potential as illustrated in FIGS. 3 and 5, the polarity of the power supply voltage Vs is defined as negative. The state of each switching element in each of FIGS. 2 to 5 is as follows.

(FIGS. 2 and 3)
First upper-arm switching element 311: OFF
First lower-arm switching element 312: OFF
Second upper-arm switching element 321: OFF
Second lower-arm switching element 322: OFF
(FIG. 4)
First upper-arm switching element 311: OFF
First lower-arm switching element 312: ON
Second upper-arm switching element 321: OFF
Second lower-arm switching element 322: OFF
(FIG. 5)
First upper-arm switching element 311: ON
First lower-arm switching element 312: OFF
Second upper-arm switching element 321: OFF
Second lower-arm switching element 322: OFF When the first upper-arm switching element 311, the first lower-arm switching element 312, the second upper-arm switching element 321, and the second lower-arm switching element 322 are not switched on, as illustrated in FIG. 2 or 3, a current for charging the smoothing capacitor 4 flows according to the polarity of the power supply voltage. Such an operation mode is referred to as a "normal mode".

On the other hand, when the first lower-arm switching element 312 is turned ON while the power supply voltage Vs is positive, as illustrated in FIG. 4, a short-circuit path can be formed through the alternating-current power supply 1, the reactor 2, the first lower-arm switching element 312, the second lower-arm switching element 322, and the alternating-current power supply 1. When the first upper-arm switching element 311 is turned ON while the power supply voltage polarity is negative, as illustrated in FIG. 5, a short-circuit path can be formed through the alternating-current power supply 1, the second upper-arm switching element 321, the first upper-arm switching element 311, the reactor 2, and the alternating-current power supply 1. Note that forming a short-circuit path is referred to as "power supply short-circuit" and the operation mode for power supply short-circuit control is referred to as a "power supply short-circuit mode".

The power converting apparatus 100 according to the first embodiment controls switching between these operation modes under the control of the control unit 10. The control of switching between the operation modes enables switching of the power supply current Is and the bus voltage Vdc.

Figure 6:
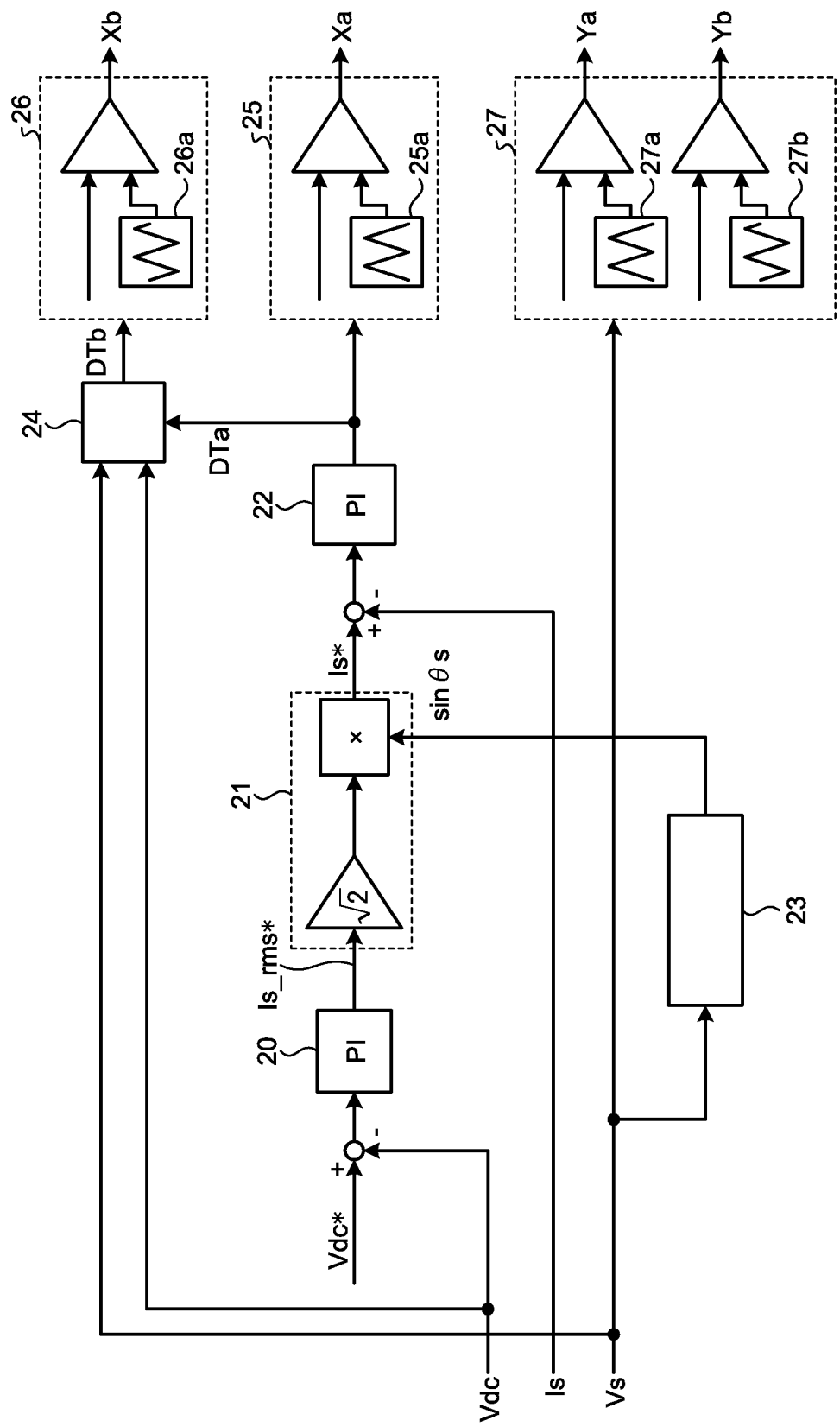
FIG. 6 is a diagram illustrating an exemplary configuration of a control unit provided in the power converting apparatus according to the first embodiment.

FIG. 6 is a diagram illustrating an exemplary configuration of the control unit 10 provided in the power converting apparatus 100 according to the first embodiment. As illustrated in FIG. 6, the control unit 10 includes a power-supply-current-command-value control unit 20, a power-supply-current-command-value calculation unit 21, an on-duty control unit 22, a power-supply-voltage-phase calculation unit 23, an on-duty calculation unit 24, a first drive pulse generation unit 25, a second drive pulse generation unit 26, and a synchronous drive pulse generation unit 27.

The control unit 10 is implemented by a microprocessor. The microprocessor may be a processor or a processing device called a central processing unit (CPU), a microcomputer, or a digital signal processor (DSP).

On the basis of the difference between the bus voltage Vdc detected by the second voltage detecting unit 7 and a bus voltage command value Vdc* set in advance, the power-supply-current-command-value control unit 20 calculates a power-supply-current-effective-value command value Is_rms*. The calculation of the power-supply-current-effective-value command value Is_rms* is implemented by proportional integral (denoted by "PI" in FIG. 6) control of the difference between the bus voltage Vdc and the bus voltage command value Vdc*. Note that proportional integral control is an example, and proportional control or proportional derivative integral control may be adopted instead of proportional integral control.

The power-supply-voltage-phase calculation unit 23 estimates a power-supply-voltage-phase estimated value θs on the basis of the power supply voltage Vs detected by the first voltage detecting unit 5. The power-supply-voltage-phase calculation unit 23 generates a sine value sines of the power-supply-voltage-phase estimated value θs on the basis of the power-supply-voltage-phase estimated value θs.

The power-supply-current-command-value calculation unit 21 calculates a power-supply-current-instantaneous-value command value Is*. As illustrated in the drawing, the power-supply-current-instantaneous-value command value Is* can be obtained from the power-supply-current-effective-value command value Is_rms* output by the power-supply-current-command-value control unit 20 and the sine value sin θs of the power-supply-voltage-phase estimated value θs output by the power-supply-voltage-phase calculation unit 23.

The on-duty control unit 22 calculates an on-duty DTa on the basis of the power-supply-current-instantaneous-value command value Is* and the power supply current Is. The on-duty DTa is a calculated duty cycle that is referred to when generating the first drive pulse Xa for turning on the first lower-arm switching element 312.

The calculation of the on-duty DTa is performed by proportional integral control of the difference between the power-supply-current-effective-value command value Is_rms* and the power supply current Is. Note that the on-duty control unit 22 may also adopt proportional control or proportional derivative integral control instead of proportional integral control.

The on-duty calculation unit 24 calculates an on-duty DTb on the basis of the power supply voltage Vs, the bus voltage Vdc, and the on-duty DTa. The on-duty DTb is a calculated duty cycle that is referred to when generating the second drive pulse Xb for turning ON the first upper-arm switching element 311.

The first drive pulse generation unit 25 generates the first drive pulse Xa by comparing the on-duty DTa with the amplitude of a first triangle wave 25a that is a carrier wave. The second drive pulse generation unit 26 generates the second drive pulse Xb by comparing the on-duty DTb with the amplitude of a second triangle wave 26a that is a carrier wave. Note that the first triangle wave 25a used in the first drive pulse generation unit 25 and the second triangle wave 26a used in the second drive pulse generation unit 26 are 180° out of phase with each other.

The synchronous drive pulse generation unit 27 generates the synchronous drive pulse Ya by comparing the power supply voltage Vs with the amplitude of a third triangle wave 27a that is a carrier wave, and generates the synchronous drive pulse Yb by comparing the power supply voltage Vs with the amplitude of a fourth triangle wave 27b that is a carrier wave. The third triangle wave 27a used for generating the synchronous drive pulse Ya and the fourth triangle wave 27b used for generating the synchronous drive pulse Yb are 180° out of phase with each other.

Figure 7:
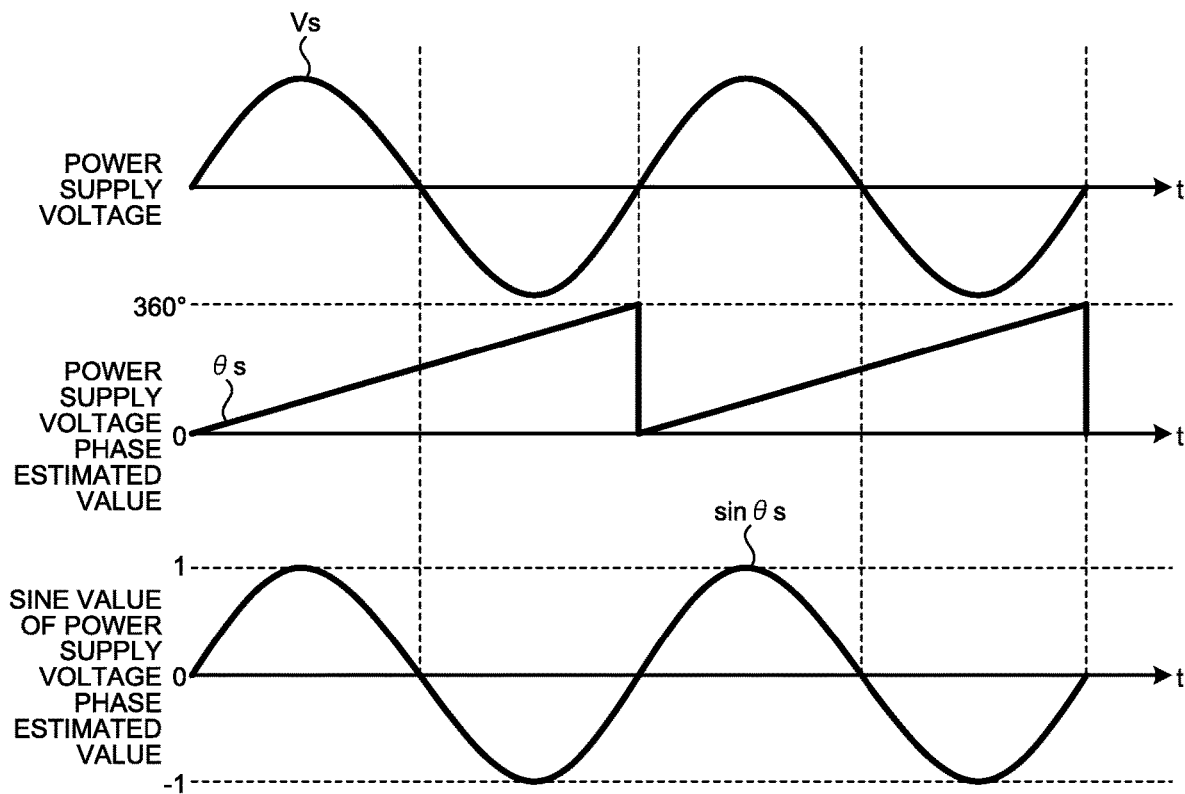
FIG. 7 is a diagram illustrating an example of how a power-supply-voltage-phase calculation unit illustrated in FIG. 6 operates.

FIG. 7 is a diagram illustrating an example of how the power-supply-voltage-phase calculation unit 23 illustrated in FIG. 6 operates. FIG. 7 illustrates the waveforms of the power supply voltage Vs, the power-supply-voltage-phase estimated value θs, and the sine value sines of the power-supply-voltage-phase estimated value θs in this order from the upper side. Note that the waveforms illustrated in FIG. 7 assume ideal conditions free from any delay due to control or any delay due to detection processing.

As illustrated in FIG. 7, the power-supply-voltage-phase estimated value θs is 360° at a point where the power supply voltage Vs switches from negative to positive. The power-supply-voltage-phase calculation unit 23 detects a point where the power supply voltage Vs switches from negative to positive, and resets the power-supply-voltage-phase estimated value θs to zero at this switching point. In a case where the interrupt function of a microcomputer is used, a circuit for detecting a zero-crossing of the power supply voltage Vs can be added to FIG. 6. In any case, any method may be used as long as the phase of the power supply voltage Vs can be detected.

Figure 8:
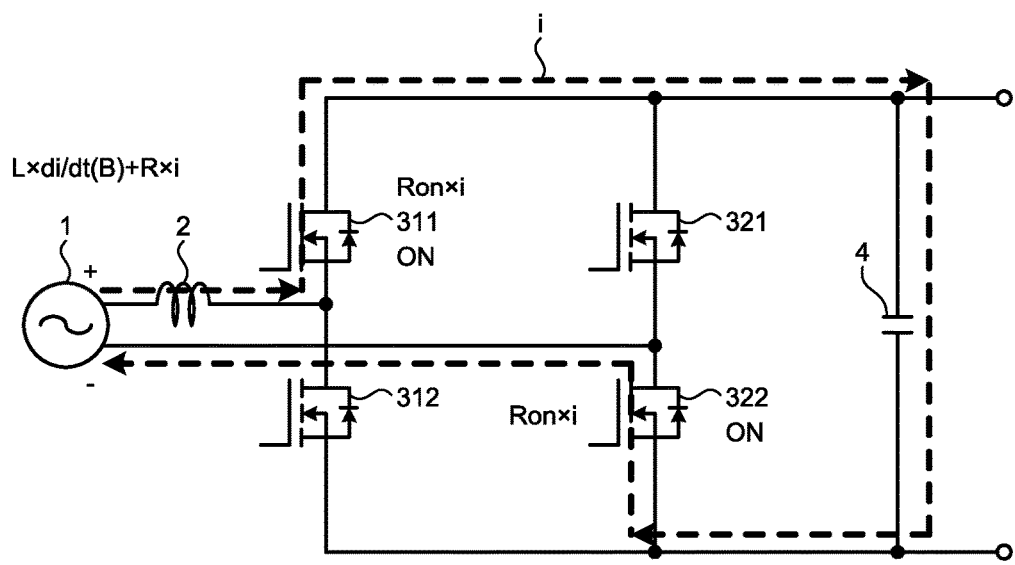
FIG. 8 is a diagram illustrating a charging path for the smoothing capacitor for the case that the power supply voltage is positive and synchronous rectification is performed.
Figure 9:
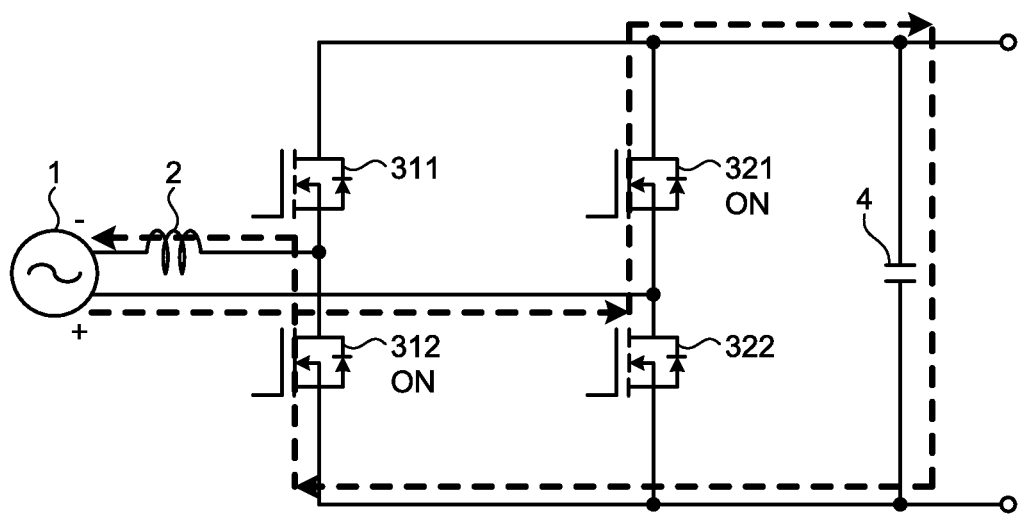
FIG. 9 is a diagram illustrating a charging path for the smoothing capacitor for the case that the power supply voltage is negative and synchronous rectification is performed.
Figure 10:
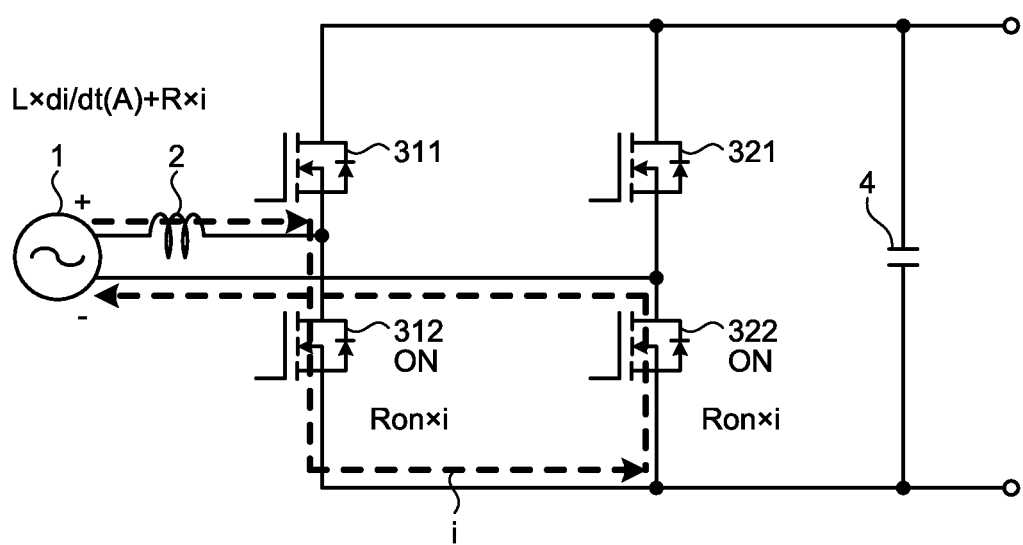
FIG. 10 is a diagram illustrating a short-circuit path for the alternating-current power supply through the reactor for the case that the power supply voltage is positive and synchronous rectification is performed.
Figure 11:
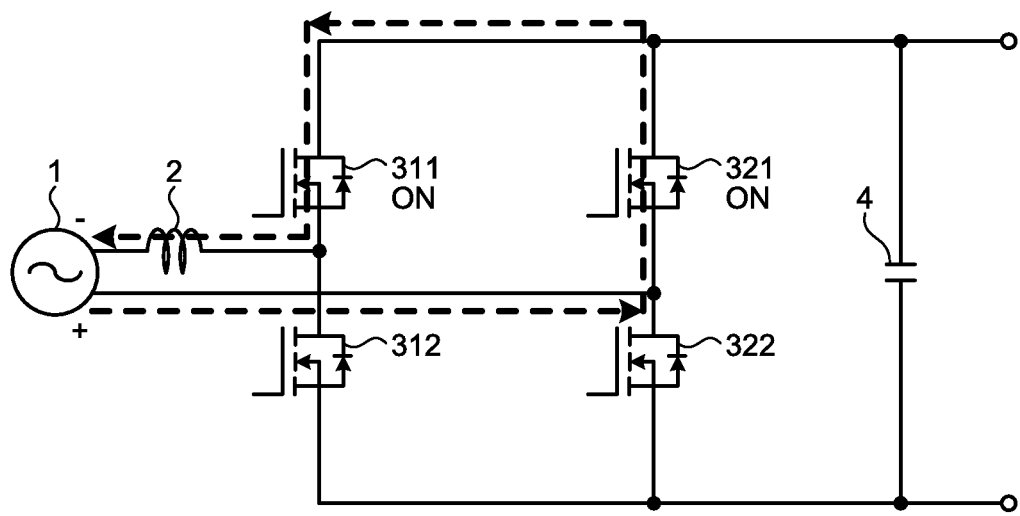
FIG. 11 is a diagram illustrating a short-circuit path for the alternating-current power supply through the reactor for the case that the power supply voltage is negative and synchronous rectification is performed.

Next, the synchronous rectification operation of the power converting apparatus 100 according to the first embodiment will be described with reference to FIGS. 8 to 11. FIGS. 8 and 9 are diagrams each illustrating a charging path for the smoothing capacitor 4 for the case that synchronous rectification is performed. The difference between the two is that the power supply voltage in FIG. 8 is positive and the power supply voltage in FIG. 9 is negative. FIGS. 10 and 11 are diagrams each illustrating a short-circuit path for the alternating-current power supply 1 through the reactor 2 for the case that synchronous rectification is performed. The difference between the two is that the power supply voltage Vs in FIG. 10 is positive and the power supply voltage Vs in FIG. 11 is negative.

FIGS. 2 and 3 depict charging paths for the smoothing capacitor 4 for the case that synchronous rectification is not performed. When the smoothing capacitor 4 is charged, in FIG. 2, since the first upper-arm switching element 311 and the second lower-arm switching element 322 are not controlled to be ON and are kept OFF, a charging current flows through the diodes. On the other hand, in FIG. 8, when the smoothing capacitor 4 is charged, the first upper-arm switching element 311 and the second lower-arm switching element 322 are controlled to be ON, so that a current flows through the channel of each switching element.

Similarly, in FIG. 3, since the first lower-arm switching element 312 and the second upper-arm switching element 321 are not controlled to be ON and are kept OFF, a charging current flows through the diodes. On the other hand, in FIG. 9, when the smoothing capacitor 4 is charged, the first lower-arm switching element 312 and the second upper-arm switching element 321 are controlled to be ON, so that a current flows through the channel of each switching element. Such control of turning ON the switching element connected in antiparallel to a rectifying diode when a current flows through the rectifying diode is called "synchronous rectification".

FIGS. 4 and 5 depict short-circuit paths for the alternating-current power supply 1 through the reactor 2 for the case that synchronous rectification is not performed. When the power supply voltage Vs is short-circuited through the reactor 2, in FIG. 4, since the second lower-arm switching element 322 is not controlled to be ON and is kept OFF, a short-circuit current flows through the diode. On the other hand, in FIG. 10, when the power supply voltage Vs is short-circuited through the reactor 2, the second lower-arm switching element 322 is controlled to be ON, so that a current flows through the channel of the second lower-arm switching element 322.

Similarly, in FIG. 5, since the second upper-arm switching element 321 is not controlled to be ON and is kept OFF, a short-circuit current flows through the diode. On the other hand, in FIG. 11, when the power supply voltage Vs is short-circuited through the reactor 2, the second upper-arm switching element 321 is controlled to be ON, so that a current flows through the channel of the second upper-arm switching element 321. Thus, synchronous rectification can also be performed when the power supply voltage Vs is short-circuited through the reactor 2.

Figure 12:
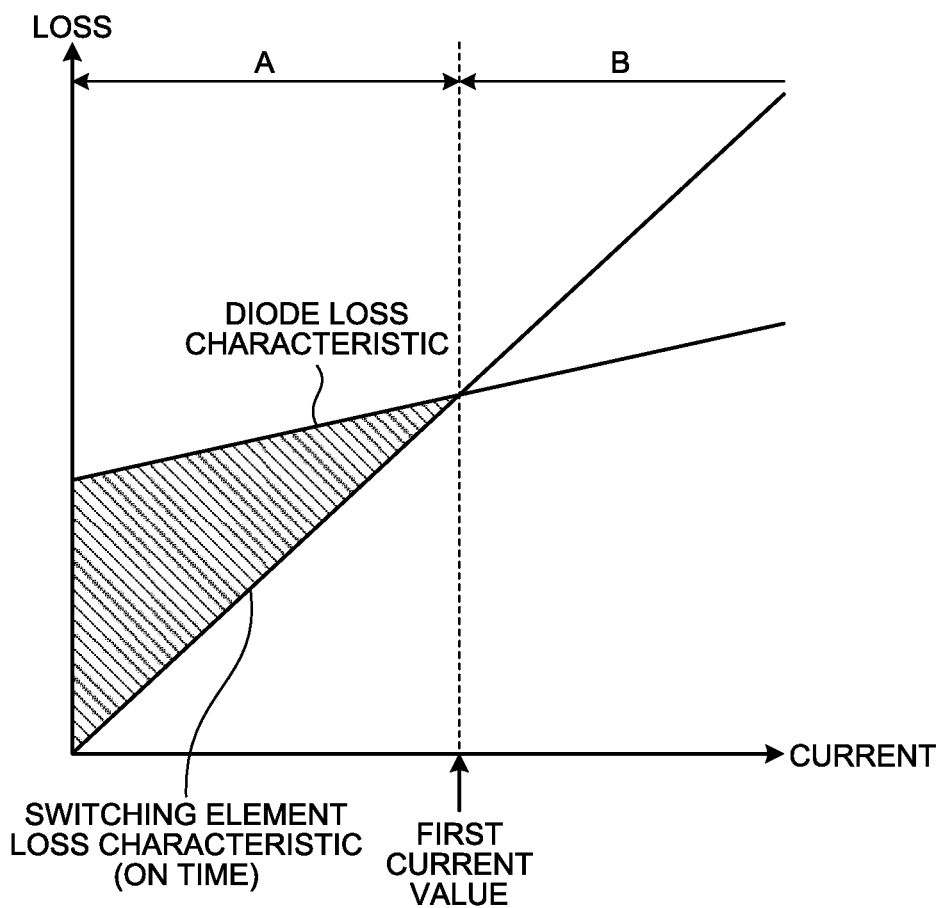
FIG. 12 is a diagram schematically illustrating the current-loss characteristics of a typical switching element.

Next, the effect of synchronous rectification will be described. FIG. 12 is a diagram schematically illustrating the current-loss characteristics of a typical switching element. In FIG. 12, the loss characteristic of the parasitic diode and the on-time loss characteristic of the switching element are illustrated. In FIG. 12, the current value at which the loss value of the loss characteristic of the parasitic diode is equal to the loss value of the loss characteristic of the switching element is defined as the first current value. The region with current values smaller than the first current value is referred to as "low current region A", and the region with current values larger than the first current value is referred to as "high current region B". In low current region A, the loss characteristic of the switching element is smaller than the loss characteristic of the parasitic diode. Conversely, in high current region B, the loss characteristic of the parasitic diode is smaller than the loss characteristic of the switching element. The first current value is held inside a computing element or in a memory readable by a computing element.

As described above, it is known that, in low current region A, the loss that occurs at the parasitic diode of a typical switching element is larger than the loss that occurs when the switching element is ON, as illustrated in FIG. 12. Note that the characteristics illustrated in FIG. 12 hold even when the parasitic diode is replaced by a diode.

In a case where switching elements are MOSFETs, a synchronous rectification technique that is based on switching characteristics can be used. The switching characteristics as used herein mean that when an on command is given to the gate of a MOSFET, the switching element is in the on state in both the direction from the drain to the source and the direction from the source to the drain, that is, current can flow through the switching element in both directions. The switching characteristics are unique because other types of switching elements such as bipolar transistors and IGBTs can conduct current only in one direction. Utilizing the switching characteristics, the diode or parasitic diode is not used in low current region A illustrated in FIG. 12 so that the switching element conducts current, whereby higher efficiency can be achieved than when the diode or parasitic diode is used.

Figure 13:
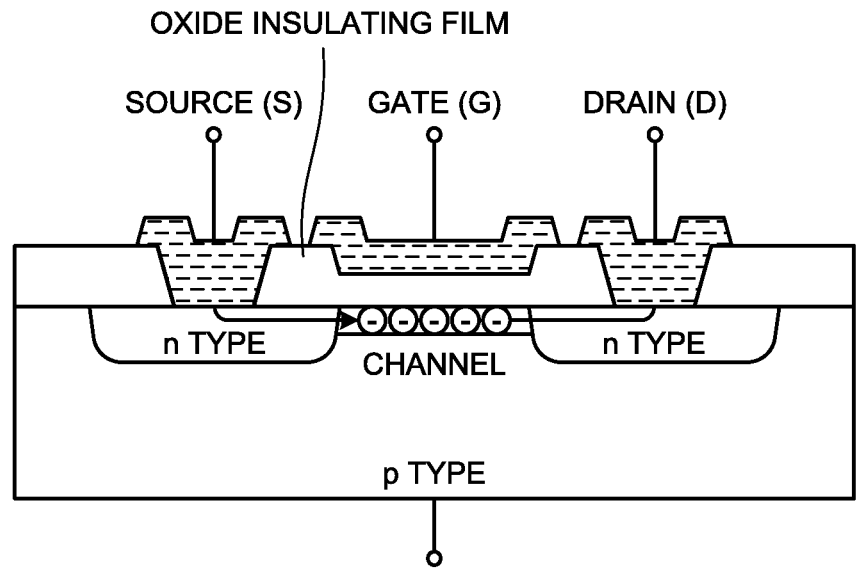
FIG. 13 is a schematic cross-sectional diagram illustrating a schematic structure of a MOSFET.

FIG. 13 is a schematic cross-sectional diagram illustrating a schematic structure of a MOSFET. In FIG. 13, an n-type MOSFET is illustrated.

In the case of the n-type MOSFET, a p-type semiconductor substrate is used as illustrated in FIG. 13. A source electrode (S), a drain electrode (D), and a gate electrode (G) are formed on the p-type semiconductor substrate. High-concentration impurities are ion-implanted into the contacts with the source electrode (S) and the drain electrode (D) to form n-type regions. On the p-type semiconductor substrate, an oxide insulating film is formed between a portion without an n-type region and the gate electrode (G). That is, the oxide insulating film is interposed between the gate electrode (G) and the p-type region of the semiconductor substrate.

When a positive voltage is applied to the gate electrode (G), electrons are attracted to the interface between the p-type region of the semiconductor substrate and the oxide insulating film, and are negatively charged. In the place where electrons gather, the density of electrons is greater than that of holes. Therefore, this place becomes n-type. This n-type portion serves as a current path that is called a channel. FIG. 13 is an example in which an n-type channel is formed. In the case of a p-type MOSFET, a p-type channel is formed.

When synchronous rectification is performed, since a MOSFET is controlled to be on, the flow of current through the channel side is larger than the flow of current through the diode or parasitic diode side.

Next, the specific operation of synchronous rectification will be described. First, consider the case in which the power supply voltage Vs is positive.

As illustrated in FIG. 2, when the first upper-arm switching element 311 and the second lower-arm switching element 322 are in the OFF state, a charging current flows through each diode of the first upper-arm switching element 311 and the second lower-arm switching element 322. On the other hand, when the first upper-arm switching element 311 and the second lower-arm switching element 322 are controlled to be ON as illustrated in FIG. 8, a charging current flows through each channel of the first upper-arm switching element 311 and the second lower-arm switching element 322. The charging current is not so large, except in the case of initial charge. Therefore, FIG. 8 in which the first upper-arm switching element 311 and the second lower-arm switching element 322 are controlled to be ON so that a current flows through each channel has lower loss than FIG. 2 in which a current flows through the parasitic diodes or diodes.

Although FIGS. 2 and 8 above are normal mode operations, synchronous rectification can also be applied to the power supply short-circuit mode. In the power supply short-circuit mode, since the reactor 2 is present in the short-circuit path, the magnitude of the short-circuit current flowing through the short-circuit path is suppressed by the reactor 2. For this reason, in FIG. 4, the configuration in which the second lower-arm switching element 322 is controlled to be ON so that a current flows through the channel side has lower loss than the configuration in which a current flows through the parasitic diode or diode of the second lower-arm switching element 322.

Similarly, consider the case in which the power supply voltage Vs is negative. As illustrated in FIG. 3, when the first lower-arm switching element 312 and the second upper-arm switching element 321 are in the OFF state, a charging current flows through each diode of the first lower-arm switching element 312 and the second upper-arm switching element 321. On the other hand, when the first lower-arm switching element 312 and the second upper-arm switching element 321 are controlled to be ON as illustrated in FIG. 9, a charging current flows through each channel of the first lower-arm switching element 312 and the second upper-arm switching element 321. The charging current is not so large, except in the case of initial charge. Therefore, FIG. 9 in which the first lower-arm switching element 312 and the second upper-arm switching element 321 are controlled to be ON so that a current flows through each channel has lower loss than FIG. 3 in which a current flows through the parasitic diodes or diodes.

Although FIGS. 3 and 9 above are normal mode operations, synchronous rectification can also be applied to the power supply short-circuit mode. In the power supply short-circuit mode, since the reactor 2 is present in the short-circuit path, the magnitude of the short-circuit current flowing through the short-circuit path is suppressed by the reactor 2. For this reason, in FIG. 5, the configuration in which the second upper-arm switching element 321 is controlled to be ON so that a current flows through the channel side has lower loss than the configuration in which a current flows through the parasitic diode or diode of the second upper-arm switching element 321.

By applying synchronous rectification as described above, it is possible to drive the power converting apparatus 100 with low loss. Synchronous rectification can be implemented by the function of the control unit 10.

As illustrated in FIG. 12, in the case of high current region B, the loss at the parasitic diode or diode is smaller than the on-time loss characteristic of the switching element. Therefore, in high current region B, switching off the second leg 32 has lower loss than switching on the second leg 32. Therefore, in a preferable embodiment, the method of switching control is switched according to the magnitude of the current flowing through the second upper-arm switching element 321 and the second lower-arm switching element 322 of the second leg 32. Note that the value of the current flowing through the second upper-arm switching element 321 and the second lower-arm switching element 322 can be calculated by the computing element of the control unit 10 using the value detected by the power supply current detecting unit 6.

Figure 14:
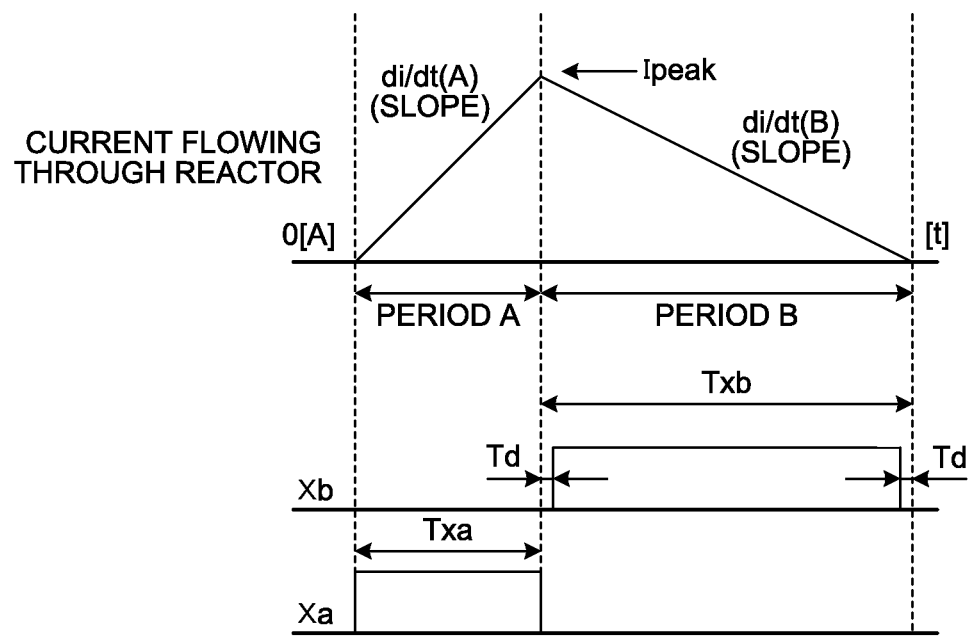
FIG. 14 is a first timing chart illustrating the relationship between the current flowing through the reactor illustrated in FIG. 1, the first drive pulse, and the second drive pulse.
Figure 15:
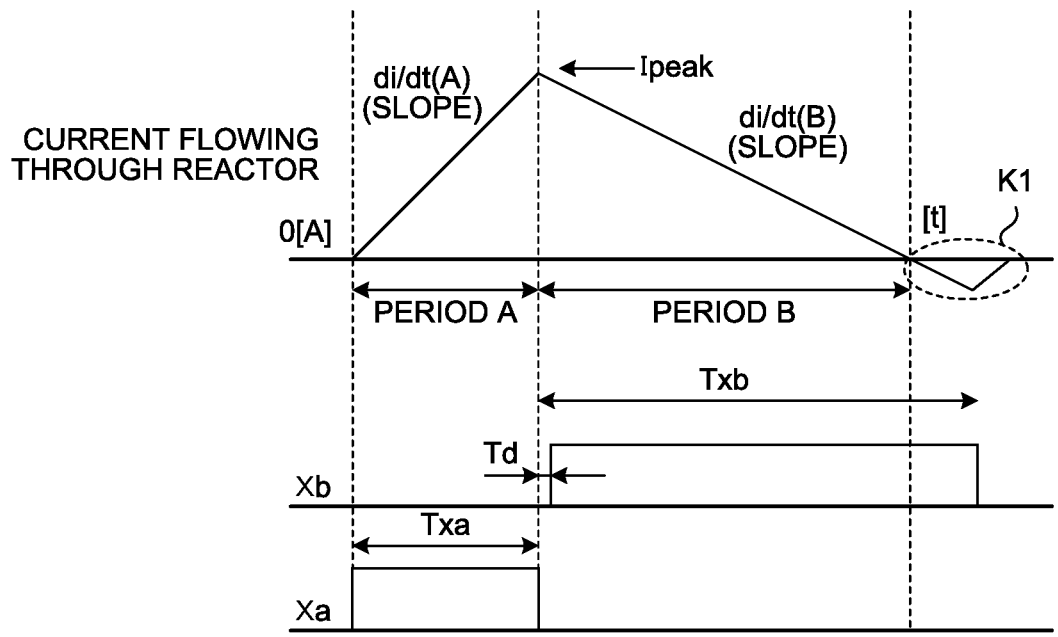
FIG. 15 is a second timing chart illustrating the relationship between the current flowing through the reactor illustrated in FIG. 1, the first drive pulse, and the second drive pulse.
Figure 16:
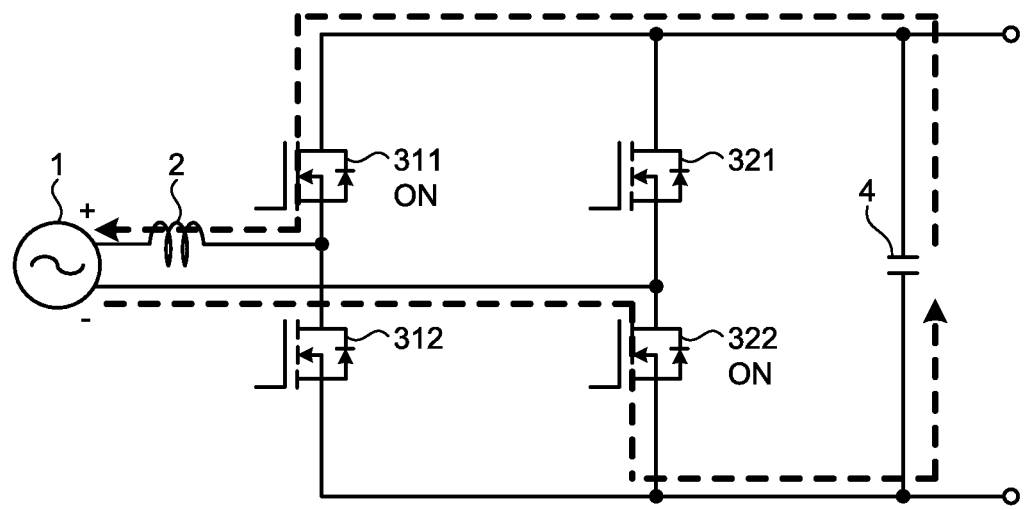
FIG. 16 is a diagram for explaining a backflow current in the first embodiment.

Next, changes in the current flowing through the reactor 2 will be described with reference to FIGS. 14 to 16. FIG. 14 is a first timing chart illustrating the relationship between the current flowing through the reactor 2 illustrated in FIG. 1, the second drive pulse Xb, and the first drive pulse Xa. FIG. 15 is a second timing chart illustrating the relationship between the current flowing through the reactor 2 illustrated in FIG. 1, the first drive pulse Xa, and the second drive pulse Xb. In each of FIGS. 14 and 15, the current flowing through the reactor 2, the first drive pulse Xa, and the second drive pulse Xb are illustrated in this order from the upper side. FIG. 16 is a diagram for explaining a backflow current in the first embodiment. This backflow current is likely to occur when the on time of the first upper-arm switching element 311 is long.

In FIGS. 14 and 15, Ipeak represents the peak value of the current flowing through the reactor 2. Period A is equal to the time from when the current flows into the reactor 2 to when the current flowing through the reactor 2 reaches the peak value Ipeak. Period B is equal to the time from when the current flowing through the reactor 2 reaches the peak value Ipeak to when the current flowing through the reactor 2 becomes 0 [A].

The reference character "Td" represents a dead time set to prevent the first upper-arm switching element 311 and the first lower-arm switching element 312 from being simultaneously on so that a short circuit does not occur. The reference character "Txa" represents the on time of the first drive pulse Xa. The reference character "Txb" represents the time obtained by adding the dead time Td to the on time of the second drive pulse Xb. That is, Txa is the time width of the first drive pulse Xa for turning ON the first lower-arm switching element 312. The time Td is less than the time Txb. Therefore, Txb may be regarded as the time width of the second drive pulse Xb for turning ON the first upper-arm switching element 311.

The on time Txb illustrated in FIG. 15 is longer than the on time Txb illustrated in FIG. 14 and longer than period B.

In period A, the first lower-arm switching element 312 is ON due to the first drive pulse Xa during the on time Txa. Consequently, a current flows through the reactor 2 and the first lower-arm switching element 312 at a slope of di/dt (A).

In period B, the first upper-arm switching element 311 is ON due to the second drive pulse Xb during the on time Txb. Consequently, a current flows through the reactor 2 and the first upper-arm switching element 311 at a slope of di/dt (B). At this time, a current flows through the reactor 2 and the first upper-arm switching element 311 regardless of whether the first upper-arm switching element 311 is driven to be ON. However, as described above, when the first upper-arm switching element 311 is driven to be ON, the conduction loss in the first upper-arm switching element 311 can be reduced.

Here, suppose the on time Txb of the first upper-arm switching element 311 is too long. As illustrated in FIG. 15, if the second lower-arm switching element 322 is ON when the current flowing through the reactor 2 is 0 [A], the backflow current indicated by broken line K1 flows through the reactor 2.

In FIG. 16, if both the first upper-arm switching element 311 and the second lower-arm switching element 322 are ON when the current flowing through the reactor 2 is 0 [A], the discharge from the smoothing capacitor 4 causes a flow of current through the positive terminal of the smoothing capacitor 4, the first upper-arm switching element 311, the reactor 2, the alternating-current power supply 1, the second lower-arm switching element 322, and the negative terminal of the smoothing capacitor 4 as indicated by the broken line. This current is a backflow current. At this time, there is a relationship of Vdc>Vs between the bus voltage Vdc and the power supply voltage Vs. The flow of the backflow current increases the conduction loss in the switching elements and reactor in the current path. Another problem of the flow of the backflow current is that the current output from the alternating-current power supply 1 cannot be sinusoidally controlled.

Therefore, the second drive pulse Xb needs to be changed from High to Low before the current flowing through the reactor 2 reaches 0 [A]. That is, the first upper-arm switching element 311 needs to be turned OFF before the current flowing through the reactor 2 reaches 0 [A]. Therefore, the second drive pulse Xb as described below is generated. In order to avoid the above problems, the second lower-arm switching element 322 may be turned OFF at the timing when the first upper-arm switching element 311 needs to be turned OFF.

FIG. 8 illustrates the path of the current that flows during period B_illustrated in FIGS. 14 and 15. FIG. 10 illustrates the path of the current that flows during period A illustrated in FIGS. 14 and 15.

The reference character "i" in FIGS. 8 and 10 represents the current flowing through the path indicated by the broken line. The reference character "di/dt (A)" in FIG. 10 represents the slope of the current i flowing through the path indicated by the broken line in FIG. 10. The reference character "di/dt (B)" in FIG. 8 represents the slope of the current i flowing through the path indicated by the broken line in FIG. 8. The reference character "L" in FIGS. 8 and 10 represents the inductance of the reactor 2. The reference character "R" in FIGS. 8 and 10 represents the resistance of the reactor 2. The reference character "Ron" in FIGS. 8 and 10 represents the on-resistance of each switching element.

When the current i illustrated in FIG. 10 flows, the peak value Ipeak of the current illustrated in FIG. 14 is calculated using the on time Txa according to Formula (1) below.

$$Ipeak = Txa \times di/dt(A) \tag{1}$$

From the circuit of FIG. 10, the power supply voltage Vs is calculated using Formula (2) below.

$$Vs = L \times di/dt(A) + R \times i + 2 \times Ron \times i \tag{2}$$

By modifying Formula (2) above, the slope di/dt (A) of the current is calculated using Formula (3) below.

$$di/dt(A) = (Vs - R \times i - 2 \times Ron \times i)/L \quad (3)$$

The peak value Ipeak of the current i flowing through the circuit illustrated in FIG. 10 is calculated using Formula (4) below by substituting Formula (3) above into Formula (1) above.

$$Ipeak = Txa \times \{(Vs - R \times i - 2 \times Ron \times i)/L\} \quad (4)$$

On the other hand, when the current i flows through the circuit illustrated in FIG. 8, the peak value Ipeak of the current illustrated in FIG. 14 is calculated using the on time Txb according to Formula (5) below.

$$Ipeak = Txb \times di/dt(B) \quad (5)$$

From the circuit of FIG. 8, the difference voltage between the bus voltage Vdc and the power supply voltage Vs is calculated using Formula (6) below.

$$Vdc - Vs = L \times di/dt(B) + R \times i + 2 \times Ron \times i \quad (6)$$

By modifying Formula (6) above, the slope di/dt (B) of the current is calculated using Formula (7) below.

$$di/dt(B) = (Vdc - Vs - R \times i - 2 \times Ron \times i)/L \quad (7)$$

The peak value Ipeak of the current i flowing through the circuit illustrated in FIG. 8 is calculated using Formula (8) below by substituting Formula (7) above into Formula (5) above.

$$Ipeak = Txb \times \{(Vdc - Vs - R \times i - 2 \times Ron \times i)/L\} \quad (8)$$

From Formulas (4) and (8) above, the relationship between the on time Txa and the on time Txb is calculated using Formula (9) below. Here, the bus voltage Vdc and the power supply voltage Vs have a relationship of Vdc>Vs−R×i−2×Ron×i.

$$Txb = Txa \times \{(Vs - R \times i - 2 \times Ron \times i)/(Vdc - Vs - R \times i - 2 \times Ron \times i)\} \quad (9)$$

That is, if the on time of the first upper-arm switching element 311 is lower than or equal to (on time of the first lower-arm switching element 312)×{(Vs−R×i−2×Ron×i)/(Vdc−Vs−R×i−2×Ron×i)}, the backflow current indicated by broken line K1 in FIG. 15 and FIG. 16 can be prevented.

However, when the bus voltage Vdc and the power supply voltage Vs have a relationship of Vdc'Vs−R×i−2×Ron×i, the second drive pulse Xb cannot be estimated. In this case, therefore, synchronous rectification based on Formula (9) above is not performed.

In order to avoid complex calculation processing, Formula (10) below, in which negligible parts are omitted, may be used for calculation processing instead of Formula (9) above. Here, the bus voltage Vdc and the power supply voltage Vs have a relationship of Vdc>Vs.

$$Txb = Txa \times \{Vs/(Vdc - Vs)\} \quad (10)$$

Formula (10) above is obtained by omitting negligible parts from Formula (9) above.

Formula (10) above shows the following characteristics: when the power supply voltage Vs and the bus voltage Vdc satisfy a relationship of Vs<Vdc≤2Vs, the on width of the on time Txb of the second drive pulse Xb is larger than the on width of the on time Txa of the first drive pulse Xa.

In the region where Vdc≤Vs, the current output from the alternating-current power supply 1 cannot be sinusoidally controlled, and the voltage across the smoothing capacitor 4 cannot be controlled to a specific value. Therefore, in the region where Vdc≤Vs, synchronous rectification based on Formula (10) above is not performed.

When the first upper-arm switching element 311 and the first lower-arm switching element 312 are simultaneously on, an arm short circuit occurs, that is, a pulse current is generated from the smoothing capacitor 4. Therefore, the dead time Td is provided. The dead time Td is a period in which the first upper-arm switching element 311 and the first lower-arm switching element 312 are not simultaneously on. Therefore, during the dead time Td, a current flows only through the parasitic diode of the first upper-arm switching element 311 or the diode connected in antiparallel.

In the configuration of the first embodiment illustrated in FIG. 1, one reactor 2 is connected between the alternating-current power supply 1 and the first leg 31. Alternatively, another reactor 2 may be inserted between the alternating-current power supply 1 and the second leg 32. This configuration enables a reduction in the capacity per reactor.

Although the power supply voltage Vs is detected in the first embodiment, only zero-cross information on the power supply voltage Vs may be detected.

In the first embodiment, MOSFETs are used as examples of the plurality of switching elements constituting the boost circuit 3. A typical MOSFET is formed of a silicon-based material. In the first embodiment, however, at least one of the plurality of MOSFETs constituting the boost circuit 3 may be a MOSFET formed of a wide bandgap semiconductor such as silicon carbide, a gallium nitride based material, or diamond. The use of a MOSFET formed of a wide bandgap semiconductor can achieve much lower loss and thus improve the efficiency. The use of a MOSFET formed of a wide bandgap semiconductor can also improve the withstand voltage performance and thus increase the allowable current density, whereby the size of the power converting apparatus can be reduced.

As described above, the power converting apparatus according to the first embodiment performs control such that when the bus voltage Vdc is larger than the power supply voltage Vs and is lower than or equal to twice the power supply voltage Vs, the width of the second drive pulse to turn ON the first upper-arm switching element is larger than the width of the first drive pulse to turn ON the first lower-arm switching element. Consequently, even when the bus voltage Vdc becomes higher than the power supply voltage Vs during synchronous rectification, it is possible to prevent a backflow current from the smoothing capacitor to the alternating-current power supply side.

Second Embodiment

Figure 17:
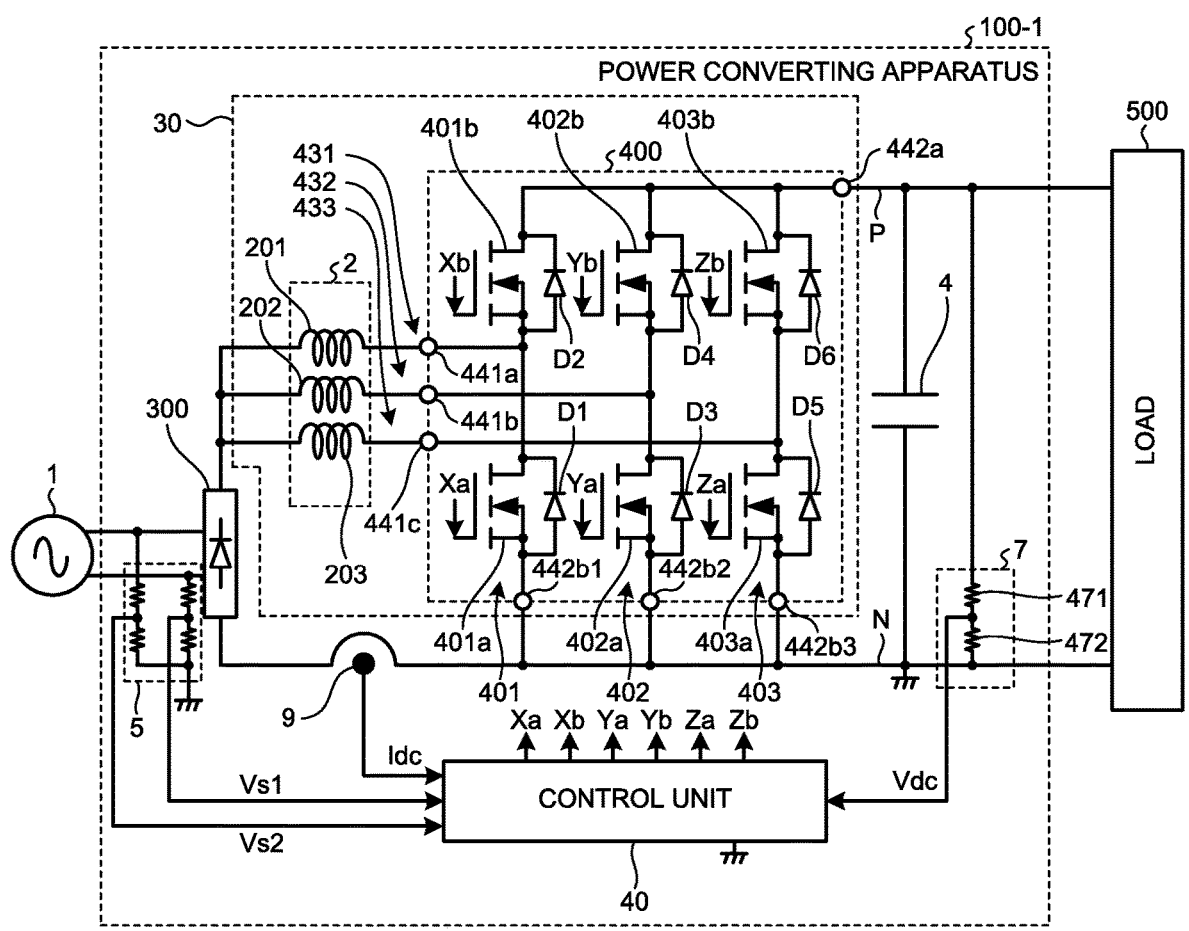
FIG. 17 is a diagram illustrating an exemplary configuration of a power converting apparatus according to a second embodiment.

FIG. 17 is a diagram illustrating an exemplary configuration of a power converting apparatus according to a second embodiment. A power converting apparatus 100-1 according to the second embodiment is an interleave type power converting apparatus connected between the single-phase alternating-current power supply 1 and the load 500. As illustrated in FIG. 17, the power converting apparatus 100-1 according to the second embodiment includes a rectifying unit 300, a boost circuit 30, the smoothing capacitor 4, the first voltage detecting unit 5, the second voltage detecting unit 7, a bus current detecting unit 9, and a control unit 40. The load 500 can be exemplified by a three-phase motor incorporated in a blower, a compressor, or an air conditioner.

The rectifying unit 300 can be exemplified by a full-wave rectifier circuit including a combination of four diodes. The rectifying unit 300 may be a combination of MOSFETs instead of diodes.

The first voltage detecting unit 5 detects a power supply voltage Vs1 which is the voltage value of one phase output from the alternating-current power supply 1 and a power supply voltage Vs2 which is the voltage value of the other phase. The detected power supply voltages Vs1 and Vs2 are output to the control unit 40. The bus current detecting unit 9 detects a bus current Idc which is the value of the bus current flowing from the rectifying unit 300 to the load 500 or the bus current flowing from the load 500 to the rectifying unit 300. The detected bus current Idc is output to the control unit 40. The bus current Idc represents a voltage corresponding to the value of the bus current.

The second voltage detecting unit 7 detects the bus voltage Vdc which is the value of the voltage applied across the smoothing capacitor 4, and the detected bus voltage Vdc is output to the control unit 40. The second voltage detecting unit 7 has a series circuit including voltage dividing resistors 471 and 472. One end of the series circuit is connected to a positive direct-current bus P. The other end of the series circuit is connected to a negative direct-current bus N. The voltage dividing resistor 471 and the voltage dividing resistor 472 divide the charging voltage of the smoothing capacitor 4 and limit the voltage to a voltage range detectable by the control unit 40.

Next, the specific configuration of the boost circuit 30 will be described. The boost circuit 30 includes the reactor 2 and a bridge circuit 400. One end of the reactor 2 is connected to the positive output terminal of the rectifying unit 300. The bridge circuit 400 is connected to the other end of the reactor 2. The reactor 2 includes three reactors connected in parallel: a first reactor 201, a second reactor 202, and a third reactor 203.

The bridge circuit 400 has a function of reducing the pulsation of the voltage rectified by the rectifying unit 300 and applying the voltage to the smoothing capacitor 4.

The bridge circuit 400 is a circuit in which a first series circuit 401, a second series circuit 402, and a third series circuit 403 are connected in parallel. The first series circuit 401 includes a first MOSFET 401a and a second MOSFET 401b connected in series. The second series circuit 402 includes a third MOSFET 402a and a fourth MOSFET 402b connected in series. The third series circuit 403 includes a fifth MOSFET 403a and a sixth MOSFET 403b connected in series.

The respective drains of the second MOSFET 401b, the fourth MOSFET 402b, and the sixth MOSFET 403b are connected to a positive output terminal 442a of the bridge circuit 400. The positive output terminal 442a is connected to the positive direct-current bus P.

The source of the first MOSFET 401a is connected to a negative output terminal 442b1 of the bridge circuit 400. The source of the third MOSFET 402a is connected to a negative output terminal 442b2 of the bridge circuit 400. The source of the fifth MOSFET 403a is connected to a negative output terminal 442b3 of the bridge circuit 400. The negative output terminal 442b1, the negative output terminal 442b2, and the negative output terminal 442b3 are connected to the negative direct-current bus N.

The source of the second MOSFET 401b is connected to the drain of the first MOSFET 401a. The source of the fourth MOSFET 402b is connected to the drain of the third MOSFET 402a. The source of the sixth MOSFET 403b is connected to the drain of the fifth MOSFET 403a.

The connection point between the first MOSFET 401a and the second MOSFET 401b is connected to a first input terminal 441a of the bridge circuit 400. The connection point between the third MOSFET 402a and the fourth MOSFET 402b is connected to a second input terminal 441b of the bridge circuit 400. The connection point between the fifth MOSFET 403a and the sixth MOSFET 403b is connected to a third input terminal 441c of the bridge circuit 400.

The second MOSFET 401b, the fourth MOSFET 402b, and the sixth MOSFET 403b constitute an upper-arm switching element group. The second MOSFET 401b, the fourth MOSFET 402b, and the sixth MOSFET 403b are connected to the positive direct-current bus P via the positive output terminal 442a.

The first MOSFET 401a, the third MOSFET 402a, and the fifth MOSFET 403a constitute a lower-arm switching element group. The first MOSFET 401a is connected to the negative direct-current bus N via the negative output terminal 442b1. The third MOSFET 402a is connected to the negative direct-current bus N via the negative output terminal 442b2. The fifth MOSFET 403a is connected to the negative direct-current bus N via the negative output terminal 442b3.

A diode D1 is connected in antiparallel to the first MOSFET 401a. The diode D1 may be a parasitic diode formed in the first MOSFET 401a. A diode D2 is connected in antiparallel to the second MOSFET 401b. The diode D2 may be a parasitic diode formed in the second MOSFET 401b. A diode D3 is connected in antiparallel to the third MOSFET 402a. The diode D3 may be a parasitic diode formed in the third MOSFET 402a. A diode D4 is connected in antiparallel to the fourth MOSFET 402b. The diode D4 may be a parasitic diode formed in the fourth MOSFET 402b. A diode D5 is connected in antiparallel to the fifth MOSFET 403a. The diode D5 may be a parasitic diode formed in the fifth MOSFET 403a. A diode D6 is connected in antiparallel to the sixth MOSFET 403b. The diode D6 may be a parasitic diode formed in the sixth MOSFET 403b.

The positive output terminal 442a of the bridge circuit 400 is connected to the positive terminal of the smoothing capacitor 4 and one end of the second voltage detecting unit 7. The negative output terminal 442b1, the negative output terminal 442b2, and the negative output terminal 442b3 of the bridge circuit 400 are connected to the negative output terminal of the rectifying unit 300, the negative terminal of the smoothing capacitor 4, and the other end of the second voltage detecting unit 7.

The first reactor 201, the first MOSFET 401a, and the second MOSFET 401b constitute a first chopper circuit 431. The second reactor 202, the third MOSFET 402a, and the fourth MOSFET 402b constitute a second chopper circuit 432. The third reactor 203, the fifth MOSFET 403a, and the sixth MOSFET 403b constitute a third chopper circuit 433.

The first reactor 201 is connected to the connection point between the first MOSFET 401a and the second MOSFET 401b via the first input terminal 441a. The second reactor 202 is connected to the connection point between the third MOSFET 402a and the fourth MOSFET 402b via the second input terminal 441b. The third reactor 203 is connected to the connection point between the fifth MOSFET 403a and the sixth MOSFET 403b via the third input terminal 441c.

In the same manner as in the first embodiment, the first MOSFET 401a and the second MOSFET 401b connected in series may be collectively referred to as the "first leg", the third MOSFET 402a and the fourth MOSFET 402b connected in series may be collectively referred to as the "second leg", and the fifth MOSFET 403a and the sixth MOSFET 403b connected in series may be collectively referred to as the "third leg".

In the same manner as in the first embodiment, the first MOSFET 401a may be referred to as the "first lower-arm switching element", the second MOSFET 401b may be referred to as the "first upper-arm switching element", the third MOSFET 402a may be referred to as the "second lower-arm switching element", the fourth MOSFET 402b may be referred to as the "second upper-arm switching element", the fifth MOSFET 403a may be referred to as the "third lower-arm switching element", and the sixth MOSFET 403b may be referred to as the "third upper-arm switching element".

The first MOSFET 401a, the second MOSFET 401b, the third MOSFET 402a, the fourth MOSFET 402b, the fifth MOSFET 403a, and the sixth MOSFET 403b may be simply referred to as the "first to sixth MOSFETs". Although the first to sixth MOSFETs may be configured from discrete semiconductor packages, in the power converting apparatus 100-1, the 6-in-1 bridge circuit 400 containing the first to sixth MOSFETs as one module is used for controlling a three-phase motor.

The control unit 40 is implemented by a microprocessor. The microprocessor may be a processor or a processing device called a CPU, a microcomputer, or a DSP.

On the basis of the power supply voltages Vs1 and Vs2 detected by the first voltage detecting unit 5, the bus current Idc detected by the bus current detecting unit 9, and the bus voltage Vdc detected by the second voltage detecting unit 7, the control unit 40 generates the first drive pulse Xa, a first drive pulse Ya, a first drive pulse Za, the second drive pulse Xb, a second drive pulse Yb, and a second drive pulse Zb.

The first drive pulse Xa is a drive pulse for driving the first MOSFET 401a. The first drive pulse Ya is a drive pulse for driving the third MOSFET 402a. The first drive pulse Za is a drive pulse for driving the fifth MOSFET 403a. The second drive pulse Xb is a drive pulse for driving the second MOSFET 401b. The second drive pulse Yb is a drive pulse for driving the fourth MOSFET 402b. The second drive pulse Zb is a drive pulse for driving the sixth MOSFET 403b.

Figure 18:
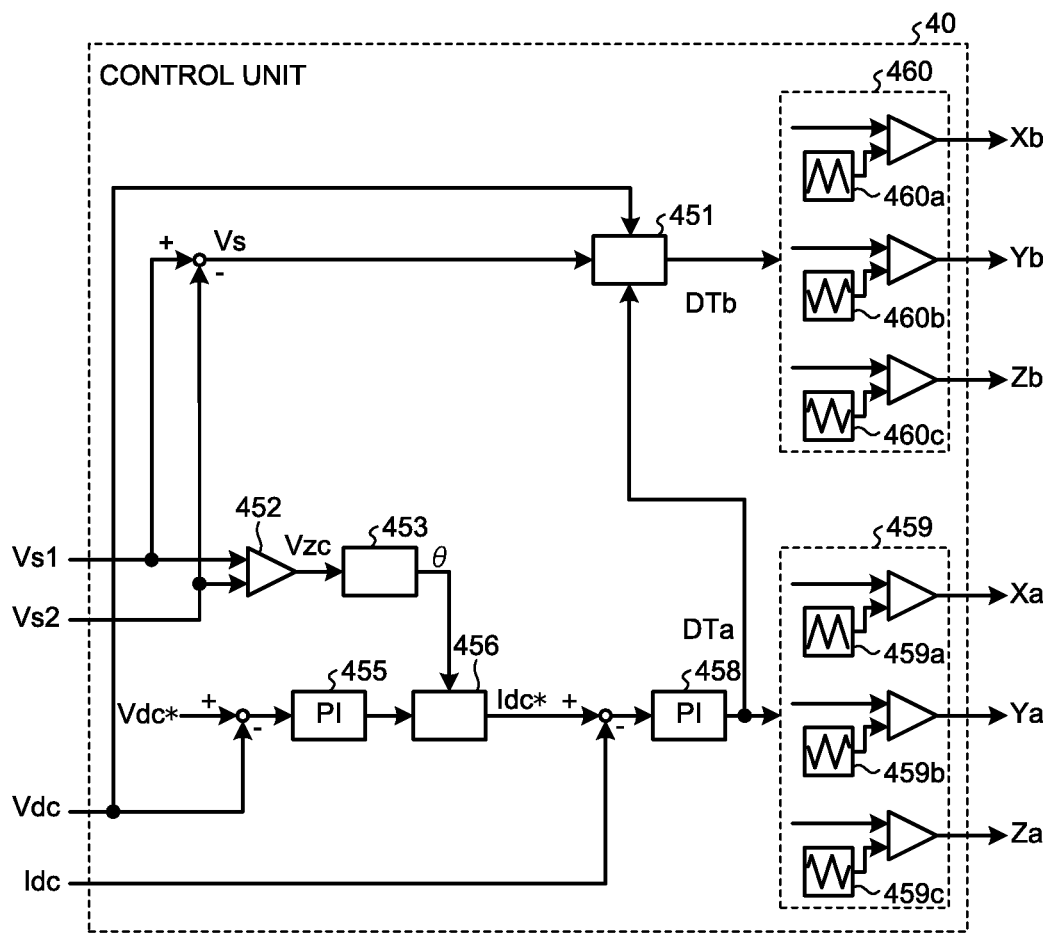
FIG. 18 is a diagram illustrating an exemplary configuration of a control unit in the power converting apparatus according to the second embodiment.

FIG. 18 is a diagram illustrating an exemplary configuration of the control unit 40 in the power converting apparatus 100-1 according to the second embodiment. As illustrated in FIG. 18, the control unit 40 includes an on-duty calculation unit 451, a comparison unit 452, a power-supply-voltage-phase calculation unit 453, a bus-current-command-value control unit 455, a bus-current-command-value calculation unit 456, an on-duty control unit 458, a first drive pulse generation unit 459, and a second drive pulse generation unit 460.

The comparison unit 452 compares the power supply voltage Vs1 and the power supply voltage Vs2 detected by the first voltage detecting unit 5, detects a zero-cross point of the power supply voltage, and outputs a zero-cross signal Vzc indicating the zero-cross point.

The power-supply-voltage-phase calculation unit 453 calculates a power supply phase θ for each half cycle on the basis of the zero-cross signal Vzc.

The bus-current-command-value control unit 455 performs proportional integral control so as to eliminate the difference between the bus voltage Vdc which is an output signal from the second voltage detecting unit 7 and the bus voltage command value Vdc* set in advance. Note that proportional control or proportional derivative integral control may be performed instead of proportional integral control.

The bus-current-command-value calculation unit 456 calculates a bus current command value Idc* on the basis of the power supply phase θ calculated by the power-supply-voltage-phase calculation unit 453 and the result of control by the bus-current-command-value control unit 455. The bus current command value Idc* is a half-wave rectification current command value whose amplitude is the result of proportional integral control and whose phase is the power supply phase θ.

The on-duty control unit 458 calculates the on-duty DTa on the basis of the bus current command value Idc* and the bus current Idc. The on-duty DTa is a calculated duty cycle that is referred to when generating the first drive pulses Xa, Ya, and Za.

The calculation of the on-duty DTa is performed by proportional integral control of the difference between the bus current command value Idc* and the bus current Idc. Note that the on-duty control unit 458 may also adopt proportional control or proportional derivative integral control instead of proportional integral control.

The on-duty calculation unit 451 calculates the on-duty DTb on the basis of the power supply voltage Vs, the bus voltage Vdc, and the on-duty DTa. The on-duty DTb is a calculated duty cycle that is referred to when generating the second drive pulses Xb, Yb, and, Zb. The power supply voltage Vs can be obtained as the difference between the power supply voltage Vs1 detected by the first voltage detecting unit 5 and the power supply voltage Vs2 detected by the first voltage detecting unit 5. The power supply voltage Vs is the absolute value of the instantaneous voltage of the alternating-current power supply 1.

The first drive pulse generation unit 459 generates the first drive pulse Xa by comparing the on-duty DTa with the amplitude of a first triangle wave 459a that is a carrier wave. The first drive pulse generation unit 459 also generates the first drive pulse Ya by comparing the on-duty DTa with the amplitude of a second triangle wave 459b that is a carrier wave. The first drive pulse generation unit 459 further generates the first drive pulse Za by comparing the on-duty DTa with the amplitude of a third triangle wave 459c that is a carrier wave. Note that the first triangle wave 459a, the second triangle wave 459b, and the third triangle wave 459c used in the first drive pulse generation unit 459 are 120° out of phase with each other.

The second drive pulse generation unit 460 generates the second drive pulse Xb by comparing the on-duty DTb with the amplitude of a fourth triangle wave 460a that is a carrier wave. The second drive pulse generation unit 460 also generates the second drive pulse Yb by comparing the on-duty DTb with the amplitude of a fifth triangle wave 460b that is a carrier wave. The second drive pulse generation unit 460 further generates the second drive pulse Zb by comparing the on-duty DTb with the amplitude of a sixth triangle wave 460c that is a carrier wave. Note that the fourth triangle wave 460a, the fifth triangle wave 460b, and the sixth triangle wave 460c used in the second drive pulse generation unit 460 are 120° out of phase with each other.

The power converting apparatus 100-1 according to the second embodiment can also achieve loss reduction by performing synchronous rectification in the manner described in the first embodiment.

Figure 19:
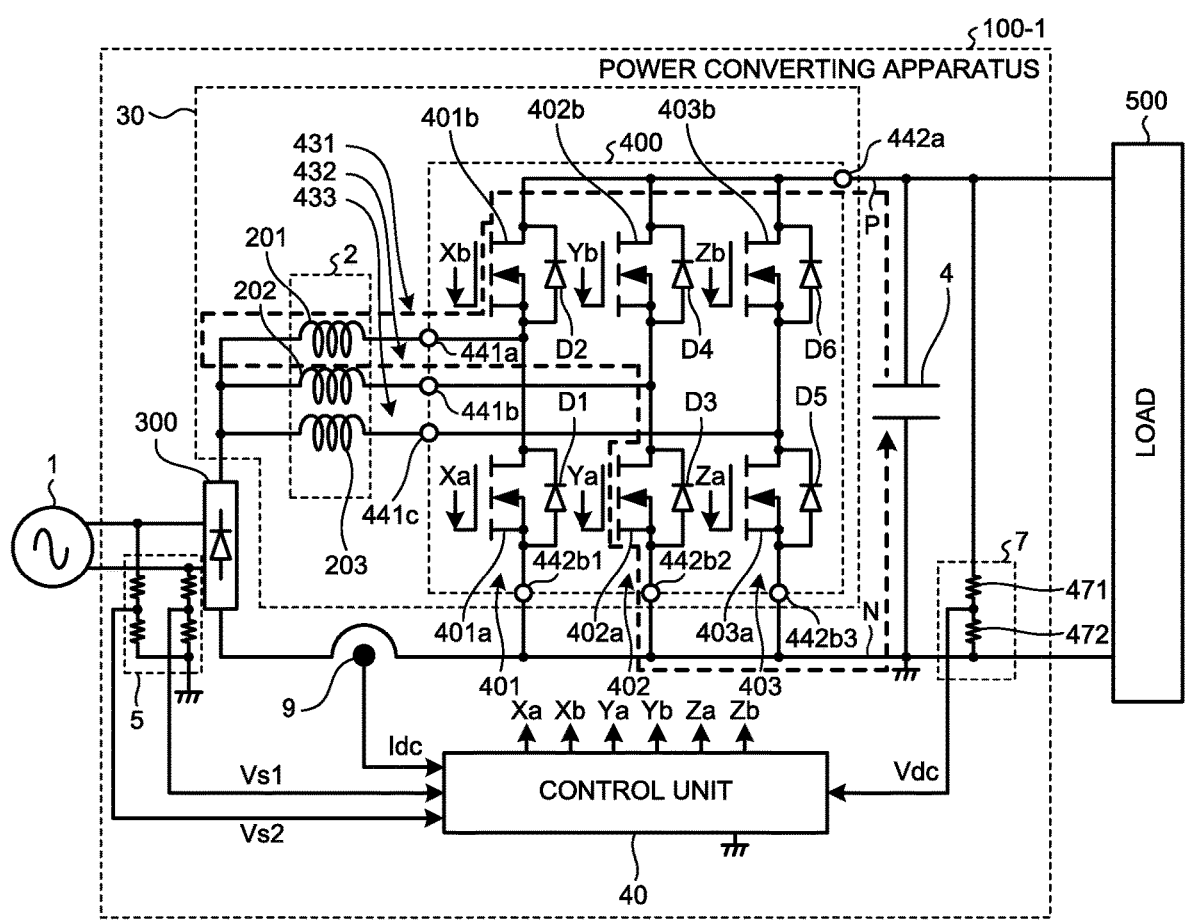
FIG. 19 is a diagram for explaining a backflow current in the second embodiment.

However, the power converting apparatus 100-1 according to the second embodiment has the problem of a backflow current as is the case in the first embodiment. FIG. 19 is a diagram for explaining a backflow current in the second embodiment. This backflow current is likely to occur when the on time of the first, second, and third upper-arm switching elements is long.

In the second embodiment, changes in the current flowing through the first reactor 201 are similar to those illustrated in the timing charts of FIGS. 14 and 15. Hereinafter, changes in the current flowing through the first reactor 201 will be described with reference to FIGS. 14, 15, and 19.

The reference character "Ipeak" represents the peak value of the current flowing through the first reactor 201. Period A is equal to the time from when the current flows into the first reactor 201 to when the current flowing through the first reactor 201 reaches the peak value Ipeak. Period B is equal to the time from when the current flowing through the first reactor 201 reaches the peak value Ipeak to when the current flowing through the first reactor 201 becomes 0 [A]. The reference character "Td" represents a dead time provided to prevent the first MOSFET 401a and the second MOSFET 401b from being short-circuited. The reference character "Txa" represents the on time of the first drive pulse Xa. The reference character "Txb" is equal to the time obtained by adding the dead time Td to the on time of the second drive pulse Xb.

In period A, the first MOSFET 401a is ON due to the first drive pulse Xa during the on time Txa. Consequently, a current flows through the first reactor 201 and the first MOSFET 401a at a slope of di/dt (A).

In period B, the second MOSFET 401b is ON due to the second drive pulse Xb during the on time Txb. Consequently, a current flows through the first reactor 201 and the second MOSFET 401b at a slope of di/dt (B). At this time, a current flows through the first reactor 201 and the second MOSFET 401b regardless of whether the second MOSFET 401b is driven to be ON. However, as described above, when the second MOSFET 401b is driven to be ON, the conduction loss in the second MOSFET 401b can be reduced.

Here, suppose the on time Txb of the second MOSFET 401b is too long. As illustrated in FIG. 15, if the MOSFET of another phase is ON when the current flowing through the first reactor 201 is 0 [A], the backflow current indicated by broken line K1 flows through the first reactor 201.

In FIG. 19, if both the second MOSFET 401b and the third MOSFET 402a are ON when the current flowing through the reactor 2 is 0 [A], the discharge from the smoothing capacitor 4 causes a flow of current through the positive terminal of the smoothing capacitor 4, the second MOSFET 401b, the first reactor 201, the second reactor 202, the third MOSFET 402a, and the negative terminal of the smoothing capacitor 4 as indicated by the broken line. This current is a backflow current. The same applies to the case where the fifth MOSFET 403a is ON, not the third MOSFET 402a. The flow of the backflow current increases the conduction loss in the switching elements and reactors in the current path. Another problem of the flow of the backflow current is that the current output from the alternating-current power supply 1 cannot be sinusoidally controlled.

Therefore, the second drive pulse Xb needs to turn OFF the second MOSFET 401b before the current flowing through the first reactor 201 reaches 0 [A]. Alternatively, the fourth MOSFET 402b needs to be turned OFF before the current flowing through the second reactor 202 reaches 0 [A]. Still alternatively, the sixth MOSFET 403b needs to be turned OFF before the current flowing through the third reactor 203 reaches 0 [A].

Figure 20:
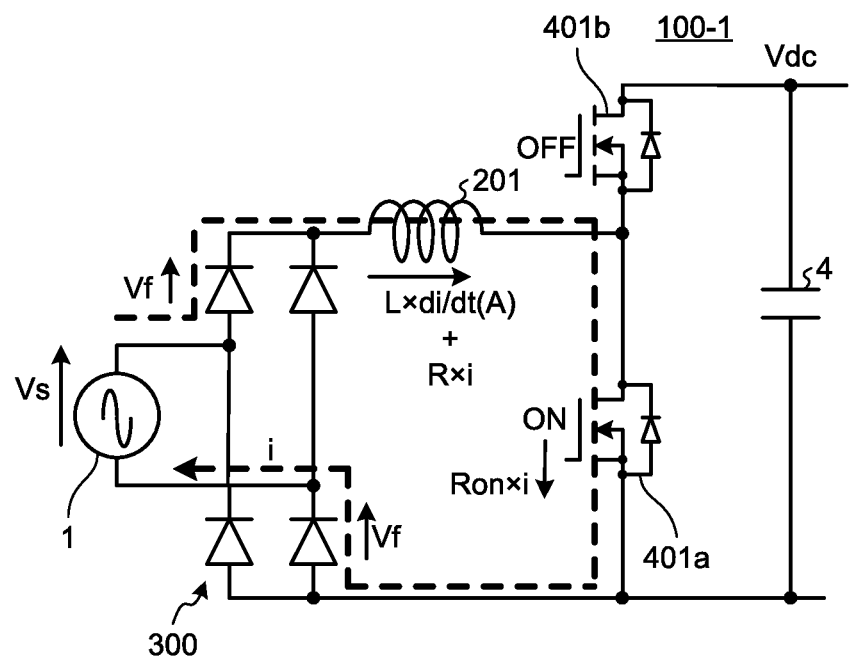
FIG. 20 is a diagram illustrating the path of the current that flows during period A illustrated in FIGS. 14 and 15 according to the second embodiment.
Figure 21:
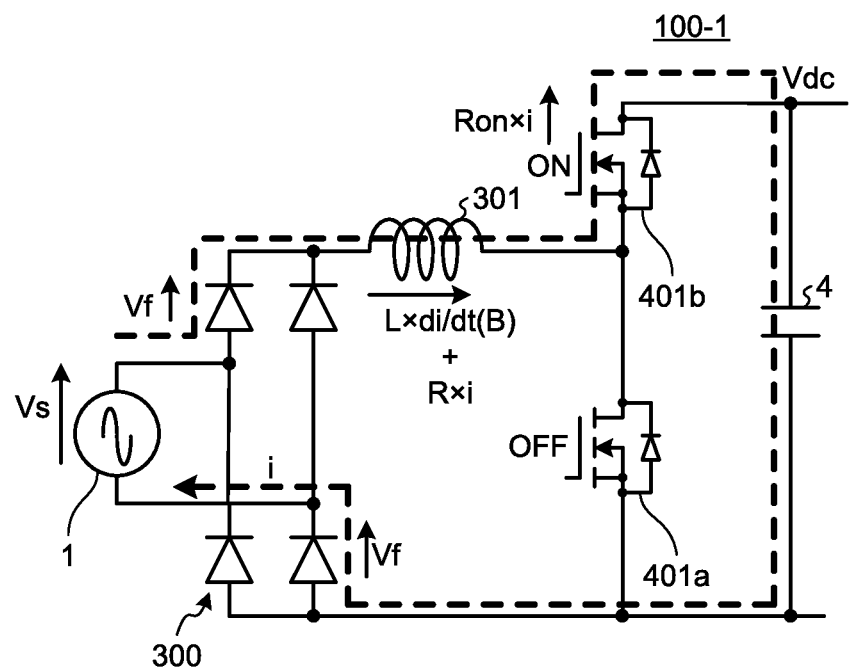
FIG. 21 is a diagram illustrating the path of the current that flows during period B illustrated in FIGS. 14 and 15 according to the second embodiment.

FIG. 20 is a diagram illustrating the path of the current that flows during period A illustrated in FIGS. 14 and 15. FIG. 21 is a diagram illustrating the path of the current that flows during period B illustrated in FIGS. 14 and 15.

FIG. 20 illustrates the path of the current that flows when the first MOSFET 401a is ON and the second MOSFET 401b is OFF. FIG. 21 illustrates the path of the current that flows when the first MOSFET 401a is OFF and the second MOSFET 401b is ON.

The reference character "i" in FIGS. 20 and 21 represents the current flowing through the path indicated by the broken line. The reference character "di/dt (A)" in FIG. 20 represents the slope of the current i flowing through the path indicated by the broken line in FIG. 20. The reference character "di/dt (B)" in FIG. 21 represents the slope of the current i flowing through the path indicated by the broken line in FIG. 21. The reference character "L" in FIGS. 20 and 21 represents the inductance of each reactor of the reactor 2. The reference character "R" in FIGS. 20 and 21 represents the resistance of each reactor of the reactor 2. The reference character "Ron" in FIGS. 20 and 21 represents the on-resistance of each MOSFET. The reference character "Vf" in FIGS. 20 and 21 represents the forward drop voltage of the diode constituting the rectifying unit 300. The reference character "Vs" in FIGS. 20 and 21 represents the absolute value of the instantaneous voltage of the alternating-current power supply 1. The reference character "Vdc" in FIGS. 20 and 21 represents the voltage across the smoothing capacitor 4, that is, the bus voltage detected by the second voltage detecting unit 7.

When the current i illustrated in FIG. 20 flows, the peak value Ipeak of the current illustrated in FIG. 14 is calculated using the on time Txa according to Formula (1) mentioned above. Formula (1) is repeated below for reference.

$$Ipeak = Txa \cdot di/dt(A) \quad (1) \text{ (repeated)}$$

From FIG. 20, the power supply voltage Vs is calculated using Formula (11) below.

$$Vs = 2 \times Vf + L \times di/dt(A) + R \times i + Ron \times i \quad (11)$$

Note that the current i can be obtained by converting the bus current Idc detected by the bus current detecting unit 9 into one third.

By modifying Formula (11) above, the slope di/dt (A) of the current is calculated using Formula (12) below.

$$di/dt(A) = (Vs - 2 \times Vf - R \times i - Ron \times i)/L \quad (12)$$

The peak value Ipeak of the current i flowing through the circuit illustrated in FIG. 20 is calculated using Formula (13) below by substituting Formula (12) above into Formula (1) above.

$$Ipeak = Txa \times \{(Vs - 2 \times Vf - R \times i - Ron \times i)/L\} \quad (13)$$

On the other hand, when the current i flows through the circuit illustrated in FIG. 20, the peak value Ipeak of the current illustrated in FIG. 14 is calculated using the on time Txb according to Formula (5) above. Formula (5) is repeated below for reference.

$$Ipeak = Txb \times di/dt(B) \quad (5) \text{ (repeated)}$$

From the circuit of FIG. 21, the difference voltage between the bus voltage Vdc and the power supply voltage Vs is calculated using Formula (14) below. In Formula (14), Vf, L, R, i, and Ron are the same as Vf, L, R, i, and Ron of Formula (11) above.

$$Vdc - Vs = 2 \times Vf + L \times di/dt(B) + R \times i + Ron \times i \quad (14)$$

By modifying Formula (14), the slope di/dt (B) of the current is calculated using Formula (15) below.

$$di/dt(B) = (Vdc - Vs - 2 \times Vf - R \times i - Ron \times i)/L \quad (15)$$

The peak value Ipeak of the current i flowing through the circuit illustrated in FIG. 21 is calculated using Formula (16) below by substituting Formula (15) above into Formula (5) above.

$$I_{peak}=Txb\times\{(Vdc-Vs-2\times Vf-R\times i-Ron\times i)/L\} \quad (16)$$

From Formulas (13) and (16) above, the relationship between the on time Txa and the on time Txb is calculated using Formula (17) below. Here, the bus voltage Vdc and the power supply voltage Vs have a relationship of Vdc>Vs−2×Vf−R×i−Ron×i.

$$Txb=Txa\times\{(Vs-2\times Vf-R\times i-Ron\times i)/(Vdc-Vs-2\times Vf-R\times i-Ron\times i)\} \quad (17)$$

That is, if the on time of the second MOSFET 401b is lower than or equal to (on time of the first MOSFET 401a)×{(Vs−2×Vf−R×i−Ron×i)/(Vdc−Vs−2×Vf−R×i−Ron×i)}, the backflow current indicated by broken line K1 in FIG. 15 and FIG. 19 can be prevented.

However, when the bus voltage Vdc and the power supply voltage Vs have a relationship of Vdc≤Vs−2×Vf−R×i−Ron×i, the second drive pulse Xb cannot be estimated. In this case, therefore, synchronous rectification based on Formula (17) above is not performed. That is, when a backflow current flows through the second MOSFET 401b, the fourth MOSFET 402b, and the sixth MOSFET 403b, the control of turning ON the second MOSFET 401b, the fourth MOSFET 402b, and the sixth MOSFET 403b is not performed.

In order to avoid complex calculation processing, Formula (10) above, in which negligible parts are omitted, may be used for calculation processing instead of Formula (17) above. Here, the bus voltage Vdc and the power supply voltage Vs have a relationship of Vdc>Vs. Formula (10) is repeated below for reference.

$$Txb=Txa\times\{Vs/(Vdc-Vs)\} \quad (10) \text{ (repeated)}$$

Formula (10) above shows the following characteristics: when the power supply voltage Vs and the bus voltage Vdc satisfy a relationship of Vs<Vdc≤2Vs, the on width of the on time Txb of the second drive pulse Xb is larger than the on width of the on time Txa of the first drive pulse Xa.

In the region where Vdc≤Vs, the current output from the alternating-current power supply 1 cannot be sinusoidally controlled, and the voltage across the smoothing capacitor 4 cannot be controlled to a specific value. Therefore, in the region where Vdc≤Vs, synchronous rectification based on Formula (10) above is not performed.

In the second embodiment, MOSFETs are used as examples of the plurality of switching elements constituting the bridge circuit 400. A typical MOSFET is formed of a silicon-based material. In the second embodiment, however, at least one of the plurality of MOSFETs constituting the bridge circuit 400 may be a MOSFET formed of a wide bandgap semiconductor such as silicon carbide, a gallium nitride based material, or diamond. The use of a MOSFET formed of a wide bandgap semiconductor can achieve much lower loss and thus improve the efficiency. The use of a MOSFET formed of a wide bandgap semiconductor can also improve the withstand voltage performance and thus increase the allowable current density, whereby the size of the power converting apparatus can be reduced.

As described above, the power converting apparatus according to the second embodiment performs control such that when the bus voltage Vdc is larger than the power supply voltage Vs and is lower than or equal to twice the power supply voltage Vs, the width of the second drive pulse to turn ON the second MOSFET is larger than the width of the first drive pulse to turn ON the first MOSFET. Consequently, even when the bus voltage Vdc becomes higher than the power supply voltage Vs during synchronous rectification, it is possible to prevent a backflow current from the smoothing capacitor to the alternating-current power supply side.

Third Embodiment

The power converting apparatus described in each of the first and second embodiments can be used as a motor drive control apparatus that supplies direct-current power to an inverter. Hereinafter, an example of the application of the power converting apparatus 100 according to the first embodiment to a motor drive control apparatus will be described.

Figure 22:
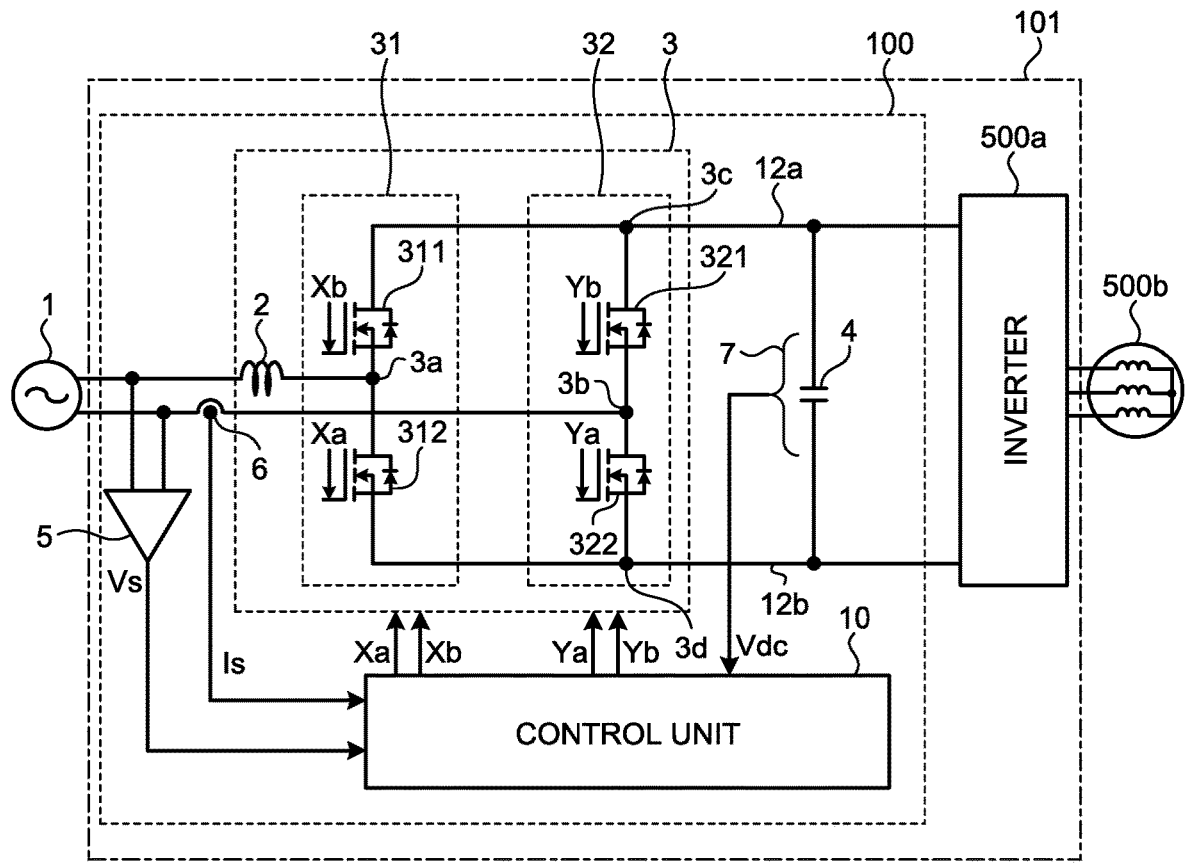
FIG. 22 is a diagram illustrating an example in which the power converting apparatus described in the first embodiment is applied to a motor drive control apparatus.

FIG. 22 is a diagram illustrating an example in which the power converting apparatus described in the first embodiment is applied to a motor drive control apparatus. A motor drive control apparatus 101 according to the third embodiment illustrated in FIG. 22 includes the power converting apparatus 100 according to the first embodiment and an inverter 500a. As described above, the power converting apparatus 100 is an apparatus that converts alternating-current power into direct-current power. The inverter 500a is a device that converts direct-current power output from the power converting apparatus 100 into alternating-current power.

A motor 500b is connected to the output side of the inverter 500a. The inverter 500a drives the motor 500b by supplying the alternating-current power obtained by conversion to the motor 500b.

The motor drive control apparatus 101 illustrated in FIG. 22 can be applied to a product such as a blower, a compressor, and an air conditioner.

Figure 23:
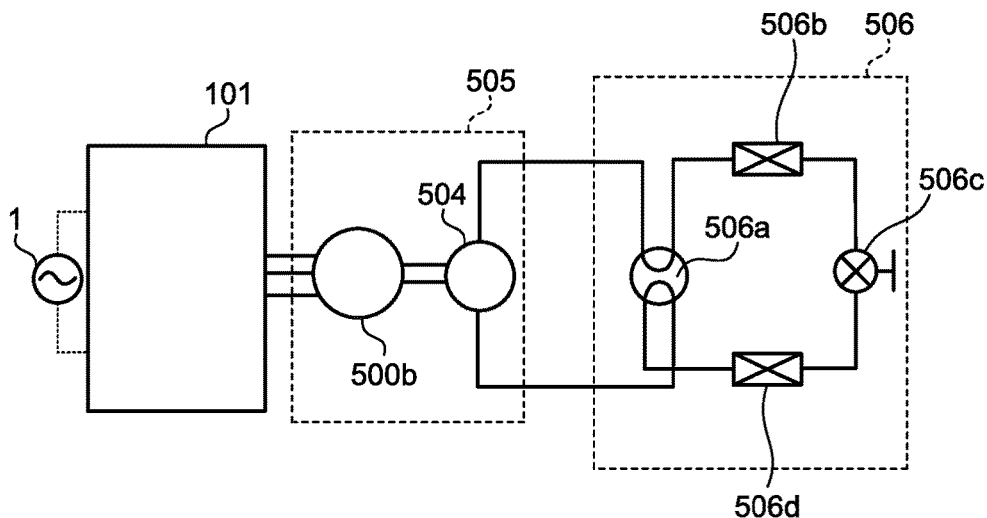
FIG. 23 is a diagram illustrating an example in which the motor drive control apparatus illustrated in FIG. 22 is applied to an air conditioner.

FIG. 23 is a diagram illustrating an example in which the motor drive control apparatus 101 illustrated in FIG. 22 is applied to an air conditioner. The motor 500b is connected to the output side of the motor drive control apparatus 101, and the motor 500b is connected to a compression element 504. A compressor 505 includes the motor 500b and the compression element 504. A refrigeration cycle unit 506 includes a four-way valve 506a, an indoor heat exchanger 506b, an expansion valve 506c, and an outdoor heat exchanger 506d.

The refrigerant circulates through the air conditioner by flowing from the compression element 504 and back to the compression element 504 through the four-way valve 506a, the indoor heat exchanger 506b, the expansion valve 506c, the outdoor heat exchanger 506d, and the four-way valve 506a again. Upon receiving alternating-current power from the alternating-current power supply 1, the motor drive control apparatus 101 rotates the motor 500b. The compression element 504 executes the operation of compressing the refrigerant as the motor 500b rotates, and circulates the refrigerant through the refrigeration cycle unit 506.

Note that the configurations described in the above-mentioned embodiments indicate examples of an aspect of the present invention. The configurations can be combined with another well-known technique, and some of the configurations can be omitted or changed in a range not departing from the gist of the present invention.

The invention claimed is:
1. A power converting apparatus comprising:
a boost circuit comprising a reactor, a first leg, and a second leg, and boosting a first voltage output from an alternating-current power supply, the reactor being connected at one end to the alternating-current power supply and being supplied with the first voltage, the first leg comprising a first upper-arm switching element and a first lower-arm switching element connected in series, a connection point between the first upper-arm switching element and the first lower-arm switching element being connected to another end of the reactor, the second leg being connected in parallel with the first leg and comprising a second upper-arm switching element and a second lower-arm switching element connected in series, a connection point between the second upper-arm switching element and the second lower-arm switching element being connected to the alternating-current power supply;

a first voltage detecting unit connected to both ends of the alternating-current power supply and detecting the first voltage;

a smoothing capacitor connected to both ends of the boost circuit and smoothing a voltage output from the boost circuit; and a second voltage detecting unit connected to both ends of the smoothing capacitor and detecting a second voltage smoothed by the smoothing capacitor, wherein when the second voltage is larger than the first voltage and is lower than or equal to twice the first voltage, a width of a second drive pulse to turn on the first upper-arm switching element is larger than a width of a first drive pulse to turn on the first lower-arm switching element.

2. The power converting apparatus according to claim 1, wherein the width of the second drive pulse satisfies a relationship of Txb≤Txa×{Vs/(Vdc−Vs)}, where Txa is the width of the first drive pulse to turn on the first lower-arm switching element, Txb is the width of the second drive pulse to turn on the first upper-arm switching element, Vs is an absolute value of the first voltage, and Vdc is the second voltage.

3. The power converting apparatus according to claim 1, wherein the width of the second drive pulse satisfies a relationship of Txb=Txa×{(Vs−R×i−2×Ron×i)/(Vdc−Vs−R×i−2×Ron×i)}, where Txa is the width of the first drive pulse to turn on the first lower-arm switching element, Txb is the width of the second drive pulse to turn on the first upper-arm switching element, R is a resistance of the reactor, Ron is an on-resistance of each of the first upper-arm switching element and the first lower-arm switching element, Vs is an absolute value of the first voltage, Vdc is the second voltage, and i is a current flowing through the reactor.

4. The power converting apparatus according to claim 1, wherein at least one of the first upper-arm switching element, the first lower-arm switching element, the second upper-arm switching element, and the second lower-arm switching element is a metal-oxide-semiconductor field-effect transistor formed of a wide bandgap semiconductor.

5. A power converting apparatus comprising:

a boost circuit comprising a rectifying unit, first to third reactors, a first leg, a second leg, and a third leg, and boosting a first voltage output from an alternating-current power supply, the rectifying unit being connected to both ends of the alternating-current power supply and being supplied with the first voltage, the first to third reactors each being connected at one end to the rectifying unit and being supplied with a voltage rectified by the rectifying unit, the first leg comprising a first upper-arm switching element and a first lower-arm switching element connected in series, a connection point between the first upper-arm switching element and the first lower-arm switching element being connected to another end of the first reactor, the second leg being connected in parallel with the first leg and comprising a second upper-arm switching element and a second lower-arm switching element connected in series, a connection point between the second upper-arm switching element and the second lower-arm switching element being connected to another end of the second reactor, the third leg being connected in parallel with the first leg and the second leg and comprising a third upper-arm switching element and a third lower-arm switching element connected in series, a connection point between the third upper-arm switching element and the third lower-arm switching element being connected to another end of the third reactor;

a first voltage detecting unit connected to both ends of the alternating-current power supply and detecting the first voltage;

a smoothing capacitor connected to both ends of the boost circuit and smoothing a voltage output from the boost circuit; and a second voltage detecting unit connected to both ends of the smoothing capacitor and detecting a second voltage smoothed by the smoothing capacitor, wherein when the second voltage is larger than the first voltage and is lower than or equal to twice the first voltage, a width of a second drive pulse to turn on the second upper-arm switching element or the third upper-arm switching element is larger than a width of a first drive pulse to turn on the first lower-arm switching element, a width of a second drive pulse to turn on the third upper-arm switching element or the first upper-arm switching element is larger than a width of a first drive pulse to turn on the second lower-arm switching element, and a width of a second drive pulse to turn on the first upper-arm switching element or the second upper-arm switching element is larger than a width of a first drive pulse to turn on the third lower-arm switching element.

6. The power converting apparatus according to claim 5, wherein the width of the second drive pulse satisfies a relationship of Txb≤Txa×{Vs/(Vdc−Vs)}, where Txa is the width of the first drive pulse to turn on the first lower-arm switching element, the second lower-arm switching element, or the third lower-arm switching element, Txb is the width of the second drive pulse to turn on the first upper-arm switching element, the second upper-arm switching element, or the third upper-arm switching element, Vs is an absolute value of the first voltage, and Vdc is the second voltage.

7. The power converting apparatus according to claim 5, wherein the width of the second drive pulse satisfies a relationship of $Txb=Txa\times\{(Vs-2\times Vf-R\times i-Ron\times i)/(Vdc-Vs-2\times Vf-R\times i-Ron\times i)\}$, where Txa is the width of the first drive pulse to turn on the first lower-arm switching element, the second lower-arm switching element, or the third lower-arm switching element, Txb is the width of the second drive pulse to turn on the first upper-arm switching element, the second upper-arm switching element, or the third upper-arm switching element, R is a resistance of each of the first reactor, the second reactor, and the third reactor, Vf is a forward drop voltage of a diode constituting the rectifying unit, Ron is an on-resistance of each of the first lower-arm switching element, the second lower-arm switching element, the third lower-arm switching element, the first upper-arm switching element, the second upper-arm switching element, and the third upper-arm switching element, Vs is an absolute value of the first voltage, Vdc is the second voltage, and i is a current flowing through the first reactor, the second reactor, or the third reactor.

8. The power converting apparatus according to claim 5, wherein at least one of the first lower-arm switching element, the second lower-arm switching element, the third lower-arm switching element, the first upper-arm switching element, the second upper-arm switching element, and the third upper-arm switching element is a metal-oxide-semiconductor field-effect transistor formed of a wide bandgap semiconductor.

9. The power converting apparatus according to claim 4, wherein the wide bandgap semiconductor is silicon carbide, a gallium nitride based material, or diamond.

10. A motor drive control apparatus comprising:

the power converting apparatus according to claim 1; and an inverter converting direct-current power output from the power converting apparatus into alternating-current power.

11. A blower comprising the motor drive control apparatus according to claim 10.

12. A compressor comprising the motor drive control apparatus according to claim 10.

13. An air conditioner comprising the blower according to claim 11.

14. An air conditioner comprising the compressor according to claim 12.

15. The power converting apparatus according to claim 8, wherein the wide bandgap semiconductor is silicon carbide, a gallium nitride based material, or diamond.

16. A motor drive control apparatus comprising:

the power converting apparatus according to claim 5; and an inverter converting direct-current power output from the power converting apparatus into alternating-current power.

17. A blower comprising the motor drive control apparatus according to claim 16.

18. A compressor comprising the motor drive control apparatus according to claim 16.

19. An air conditioner comprising the blower according to claim 17.

20. An air conditioner comprising the compressor according to claim 18.

* * * * *